(12) United States Patent
Vaney et al.

(10) Patent No.: US 12,060,132 B2
(45) Date of Patent: Aug. 13, 2024

(54) FOLDABLE SCOOTER

(71) Applicant: ALLIGATOR INTERNATIONAL DESIGN SL, Barcelona (ES)

(72) Inventors: Laurent Julien Michel Vaney, Barcelone (ES); Genis Batlle Besora, Barcelone (ES)

(73) Assignee: ALLIGATOR INTERNATIONAL DESIGN SL, Barcelona (ES)

( * ) Notice: Subject to any disclaimer, the term of this patent is extended or adjusted under 35 U.S.C. 154(b) by 182 days.

(21) Appl. No.: 17/599,305

(22) PCT Filed: Mar. 24, 2020

(86) PCT No.: PCT/EP2020/058236
§ 371 (c)(1),
(2) Date: Sep. 28, 2021

(87) PCT Pub. No.: WO2020/193586
PCT Pub. Date: Oct. 1, 2020

(65) Prior Publication Data
US 2023/0150601 A1   May 18, 2023

(30) Foreign Application Priority Data
Mar. 28, 2019  (FR) ...................................... 1903270

(51) Int. Cl.
*B62K 3/00*       (2006.01)
*B62K 15/00*      (2006.01)

(52) U.S. Cl.
CPC ............ *B62K 3/002* (2013.01); *B62K 15/006* (2013.01); *B62K 2202/00* (2013.01)

(58) Field of Classification Search
CPC ... B62K 3/002; B62K 15/006; B62K 2202/00
See application file for complete search history.

(56) References Cited

U.S. PATENT DOCUMENTS 6,227,324 B1   5/2001  Sauve
6,345,678 B1   2/2002  Chang
(Continued)

FOREIGN PATENT DOCUMENTS

CN      2446036 Y  *  9/2001
CN    205469530 U     8/2016
(Continued)

OTHER PUBLICATIONS

International Search Report issued Jun. 2, 2020 re: Application No. PCT/EP2020/058236, pp. 1-2.
(Continued)

*Primary Examiner* — Laura Freedman
(74) *Attorney, Agent, or Firm* — CANTOR COLBURN LLP

(57) ABSTRACT

A foldable scooter includes a frame and a steering column provided with a front wheel and pivotably mounted on the frame, which has a first portion supporting a rear wheel and a footboard, and a second portion supporting the steering column. The first portion and the second portion are connected by a swivel joint along a folding axis, allowing movement between:—an unfolded configuration in which the steering column projects upwards with respect to the footboard by extending in a median plane; and—a folded configuration in which the steering column is on a first side face with respect to the median plane and extends away from the median plane, at least partially underneath the footboard, along a first side edge of the footboard and opposite a first side surface of the rear wheel.

17 Claims, 12 Drawing Sheets

(56) References Cited

U.S. PATENT DOCUMENTS

| | | | |
|---|---|---|---|
| 7,040,443 B1 | 5/2006 | Roth et al. | |
| 7,156,405 B1 * | 1/2007 | Ming | B62K 3/002 |
| | | | 280/278 |
| 8,061,725 B1 | 11/2011 | Hawkins | |
| 8,459,679 B2 * | 6/2013 | Jessie, Jr. | B62K 9/02 |
| | | | 280/282 |
| 8,720,918 B2 * | 5/2014 | Liao | B62K 15/006 |
| | | | 280/87.041 |
| 8,801,009 B2 | 8/2014 | Sapir | |
| 9,187,144 B2 * | 11/2015 | Yap | B62K 15/008 |
| 9,205,890 B2 * | 12/2015 | Schreuder | B62K 3/002 |
| 9,302,173 B2 | 4/2016 | Dicarlo et al. | |
| 9,878,758 B2 * | 1/2018 | Lee | B62K 23/02 |
| 10,377,403 B2 | 8/2019 | Lee et al. | |
| 10,850,783 B2 | 12/2020 | Cordero | |
| 11,801,910 B2 * | 10/2023 | Vaney | B62K 25/005 |
| 2006/0207814 A1 | 9/2006 | Tseng | |
| 2011/0120786 A1 | 5/2011 | Lin | |
| 2019/0118647 A1 | 4/2019 | Jessie, Jr. | |
| 2019/0143232 A1 | 5/2019 | Lovley, II et al. | |
| 2019/0263468 A1 | 8/2019 | Huang et al. | |
| 2019/0367116 A1 | 12/2019 | Desberg et al. | |
| 2021/0379987 A1 | 12/2021 | Huang | |
| 2022/0169331 A1 * | 6/2022 | Vaney | B62K 15/006 |

FOREIGN PATENT DOCUMENTS

| | | | |
|---|---|---|---|
| DE | 29612276 U1 | 9/1996 | |
| DE | 202018005767 U1 | 1/2019 | |
| EP | 0836985 A2 * | 4/1998 | |
| FR | 3041321 A3 | 3/2017 | |
| FR | 3050170 A1 | 10/2017 | |
| FR | 3070155 A1 | 2/2019 | |
| JP | S6092929 A | 5/1985 | |
| WO | WO-2011054178 A1 * | 5/2011 | B62J 99/00 |

OTHER PUBLICATIONS

International Search Report issued May 18, 2020 re: Application No. PCT/EP2020/058235, pp. 1-3.

* cited by examiner

[Fig.1]
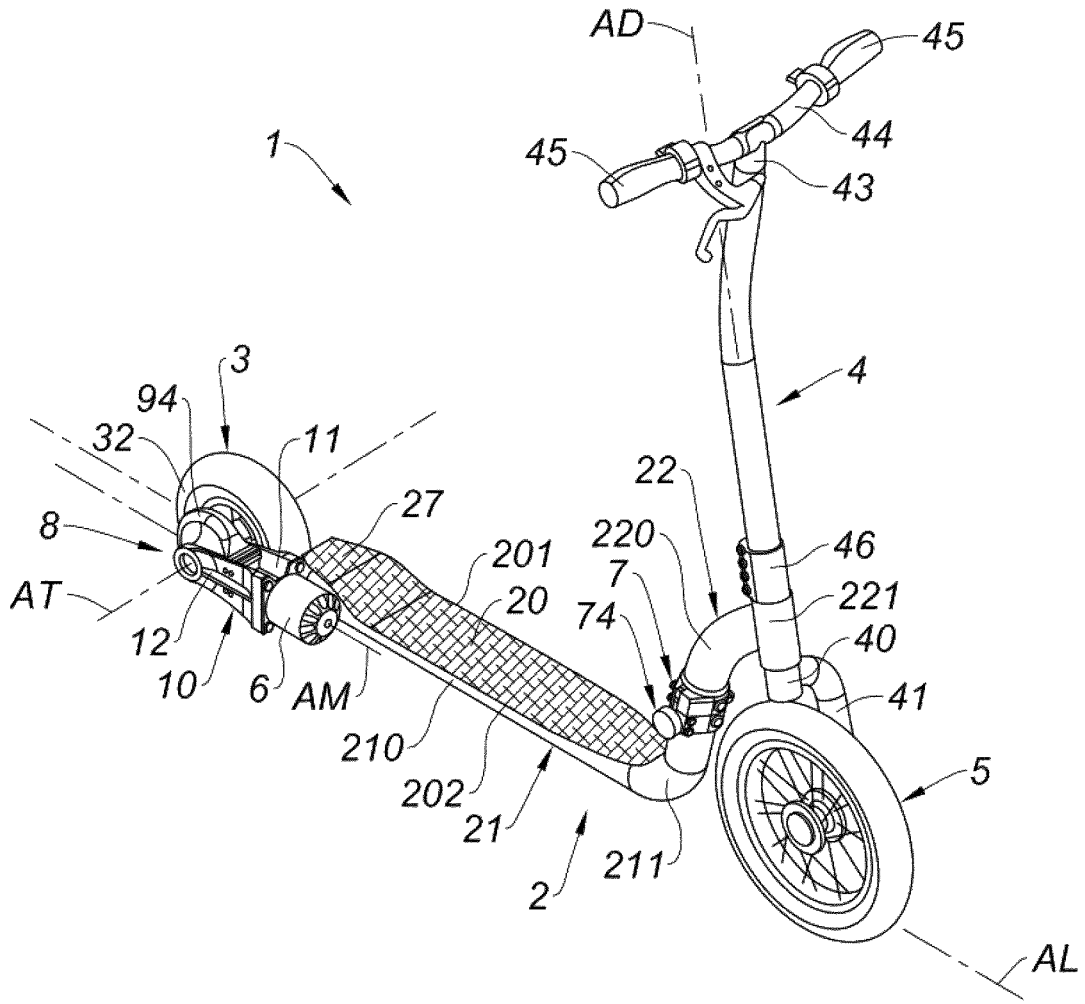
[Fig.2]
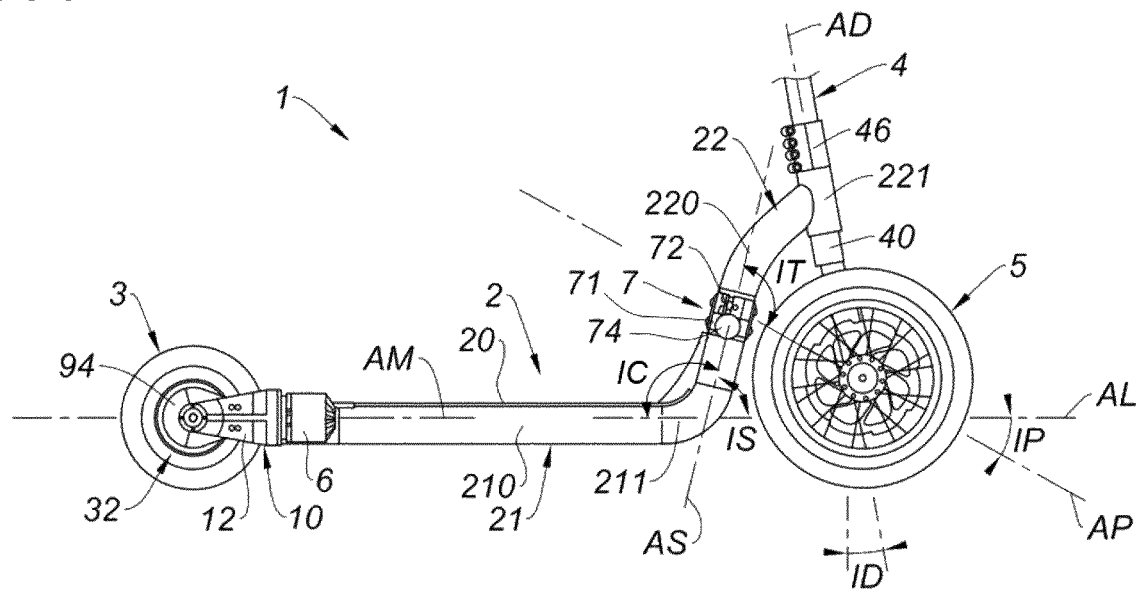

[Fig.3]
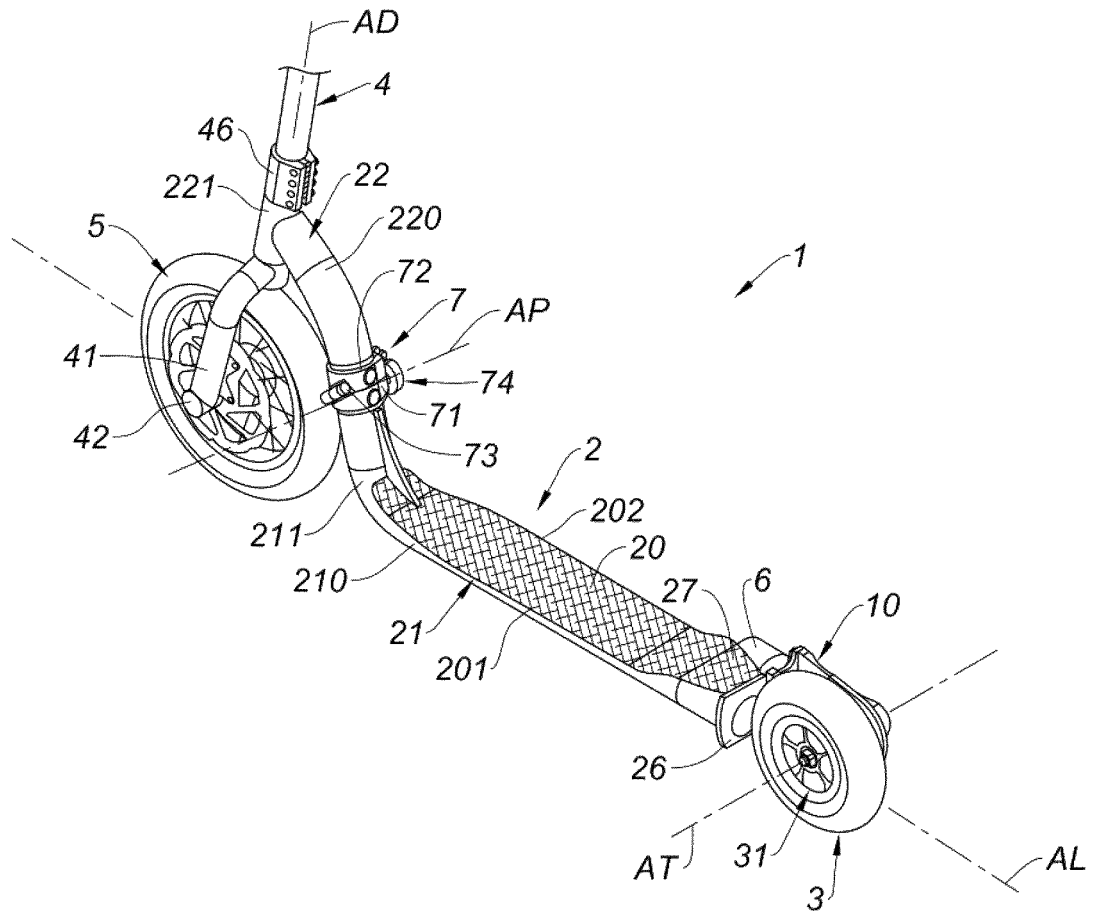
[Fig.4]
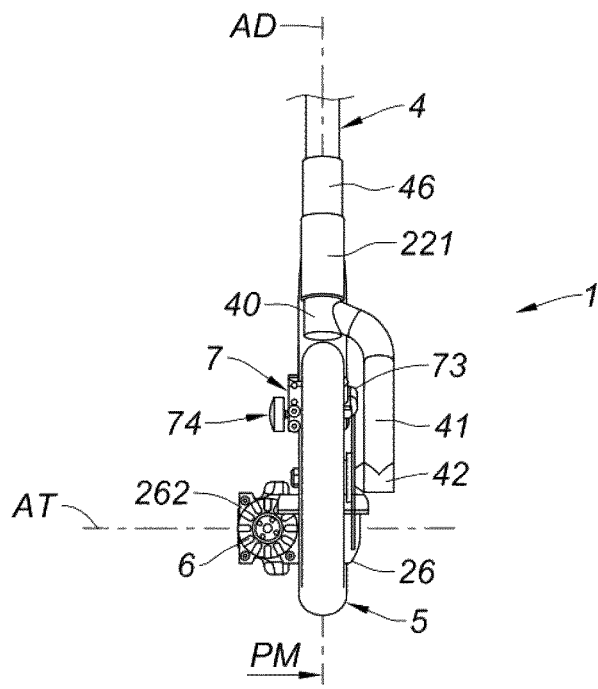

[Fig.5]
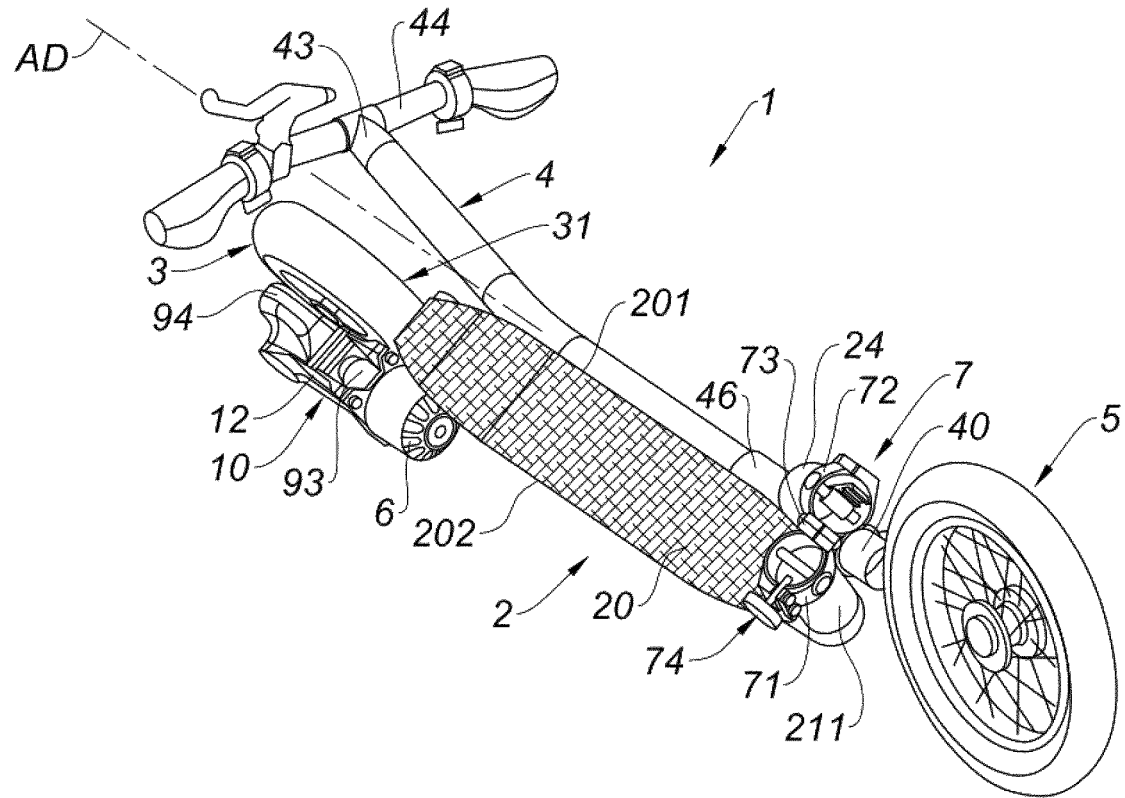
[Fig.6]
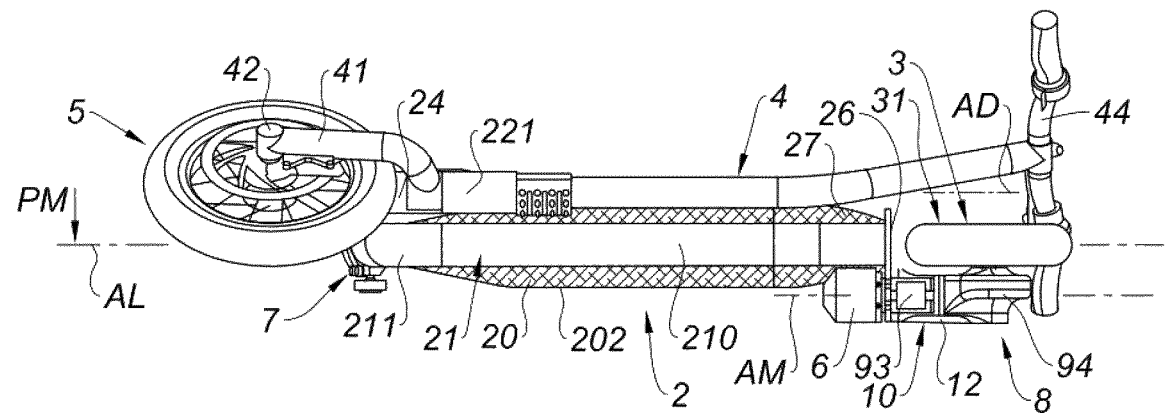

[Fig.7]
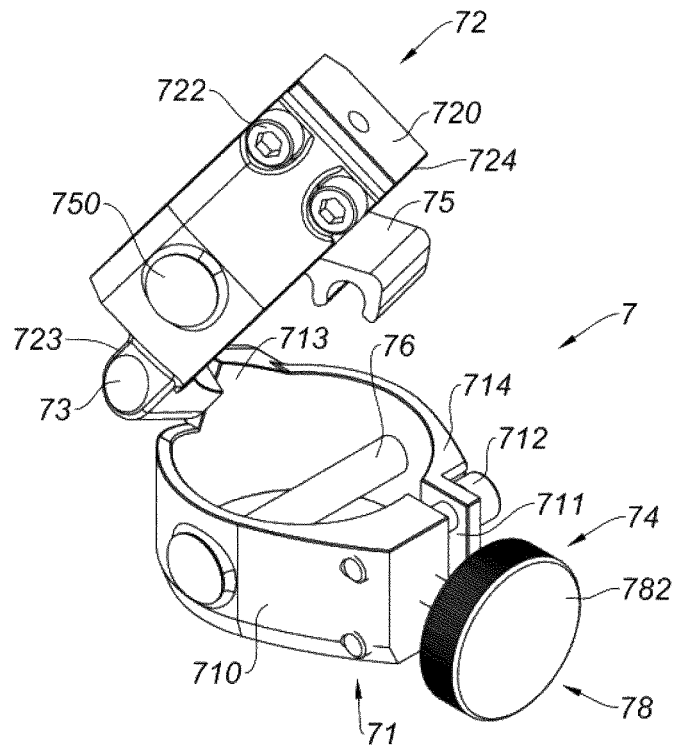
[Fig.8]
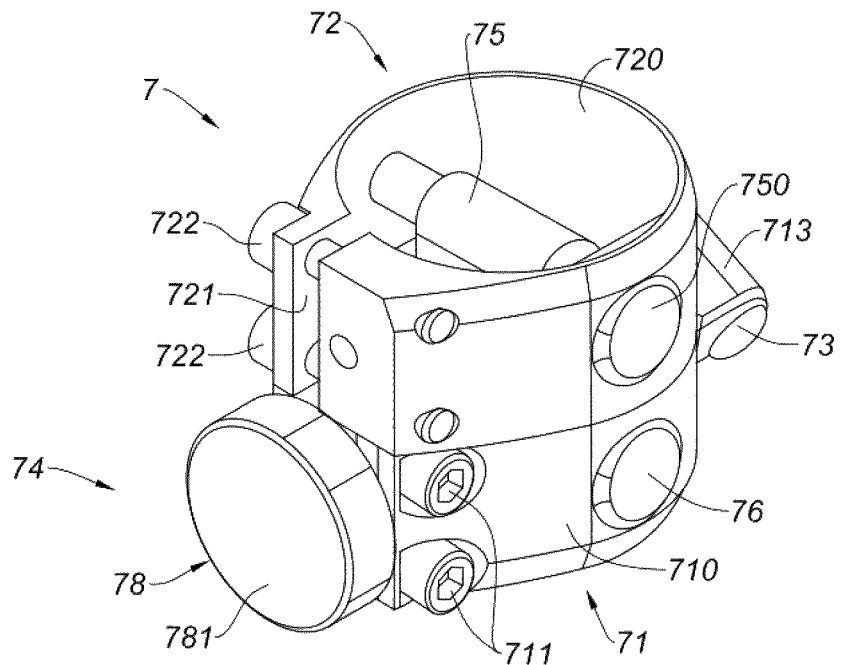

[Fig.9]
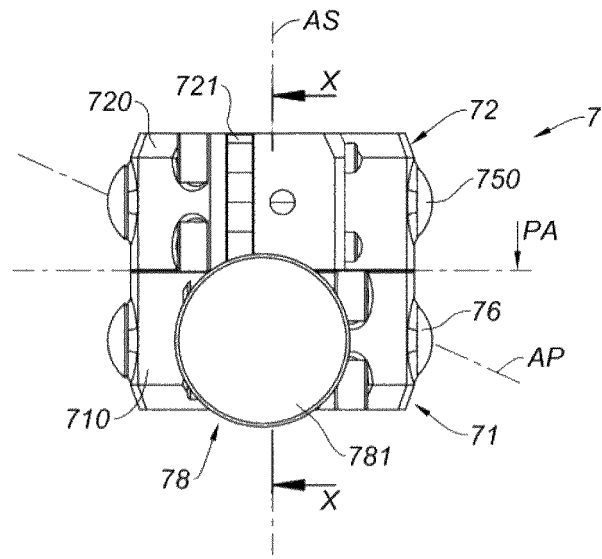
[Fig.10]
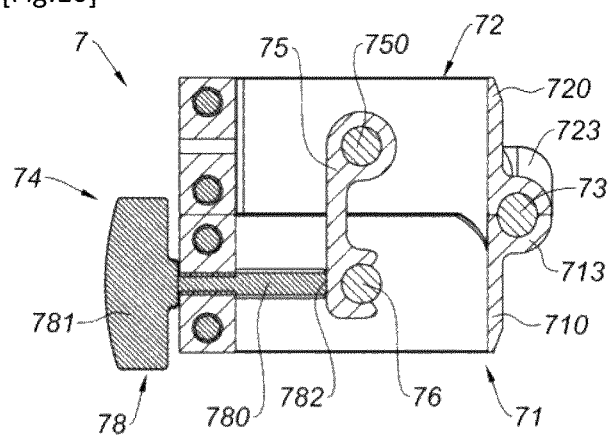
[Fig.11]
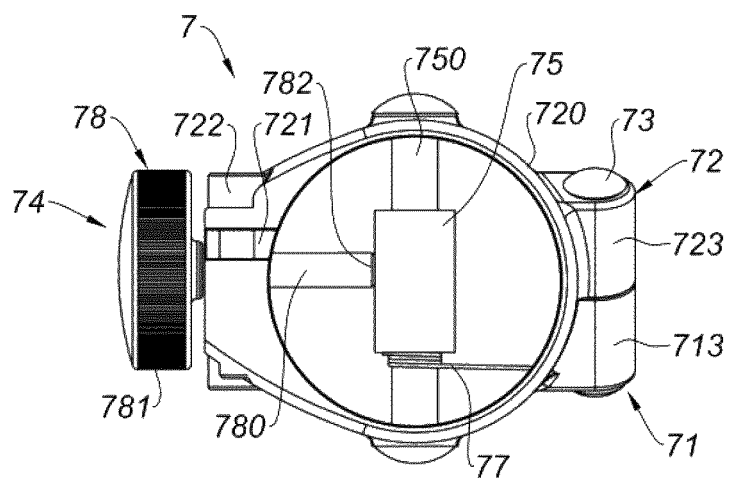

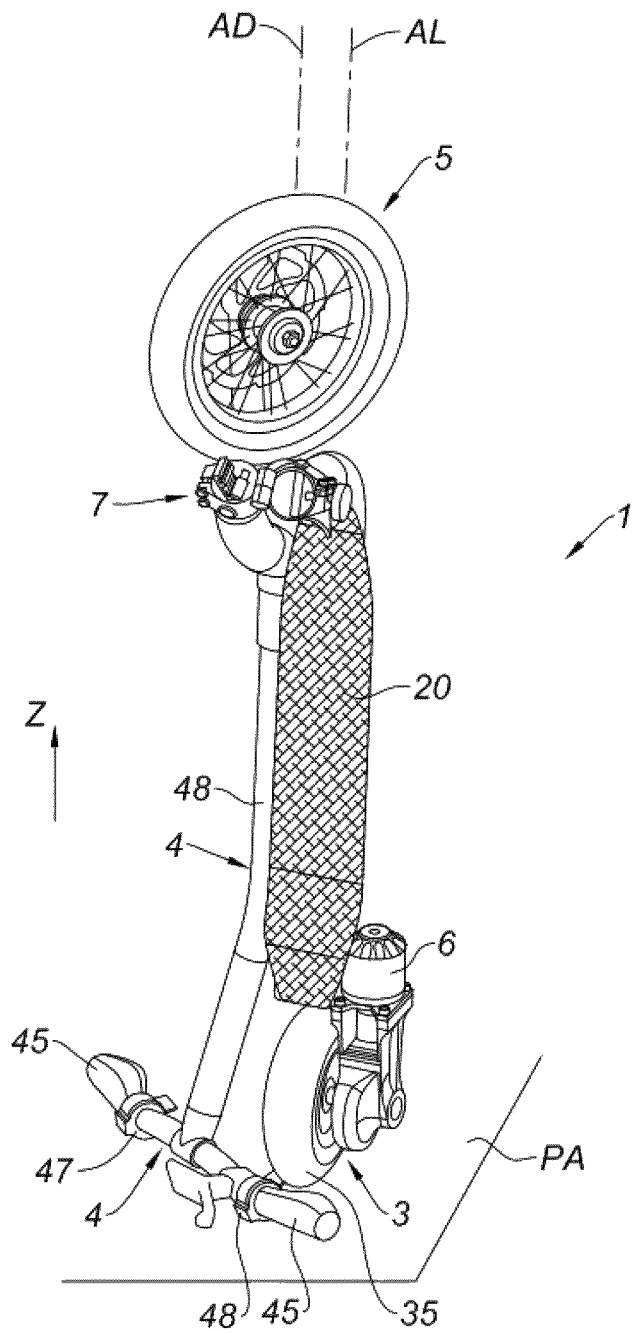
[Fig.12]

[Fig.13]
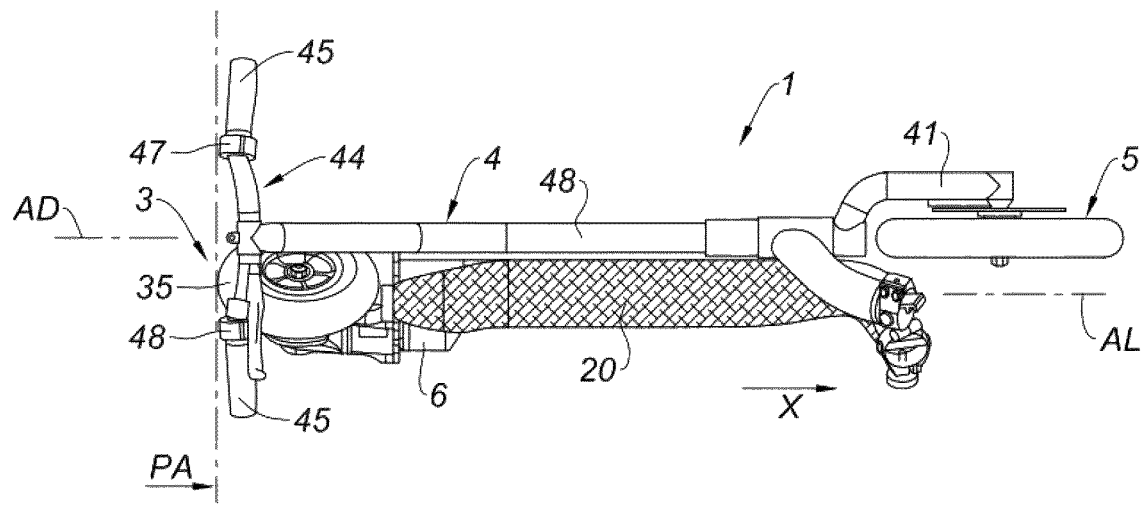
[Fig.14]
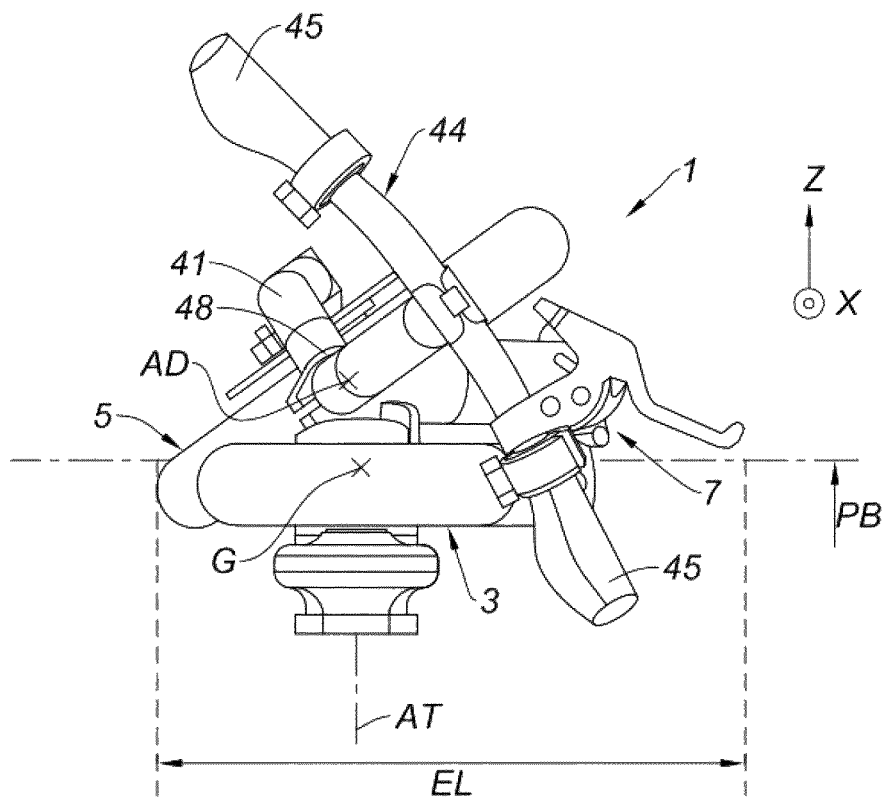

[Fig.15]
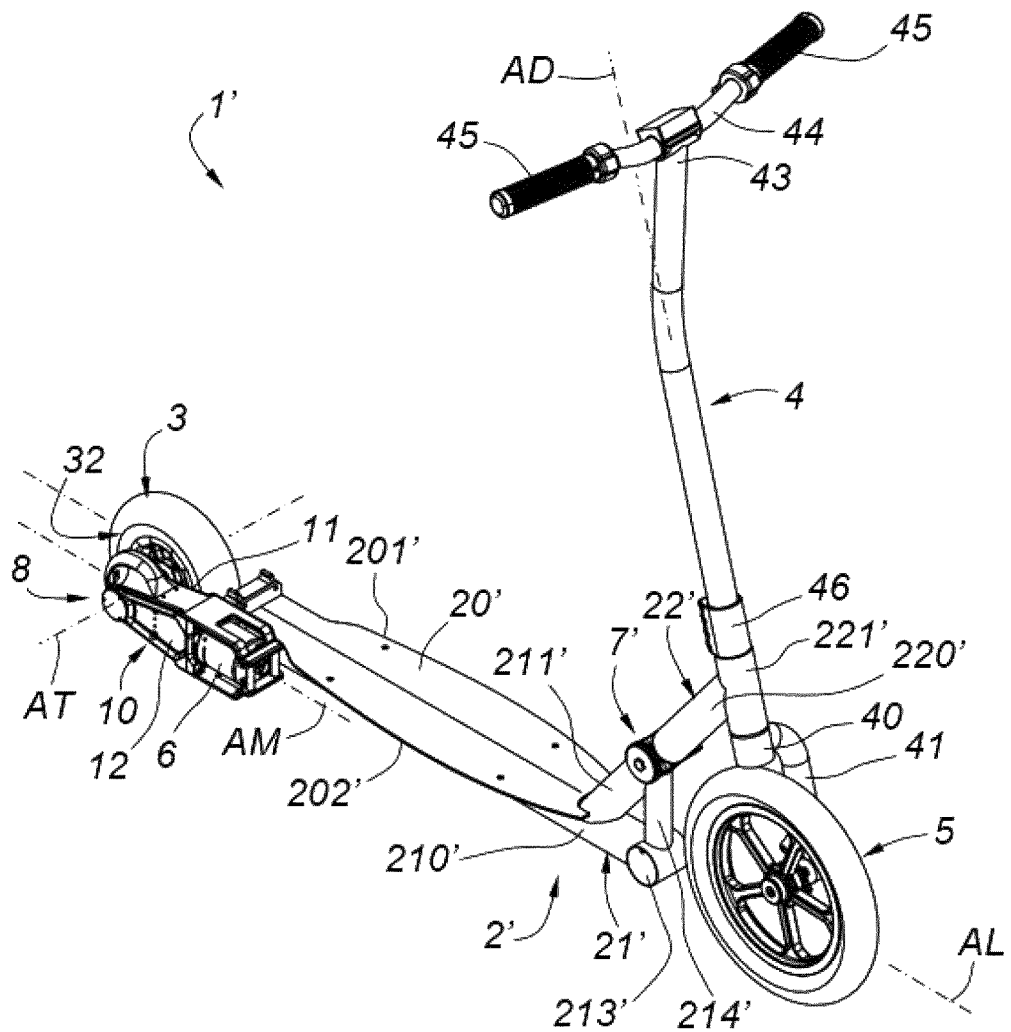

[Fig.16]
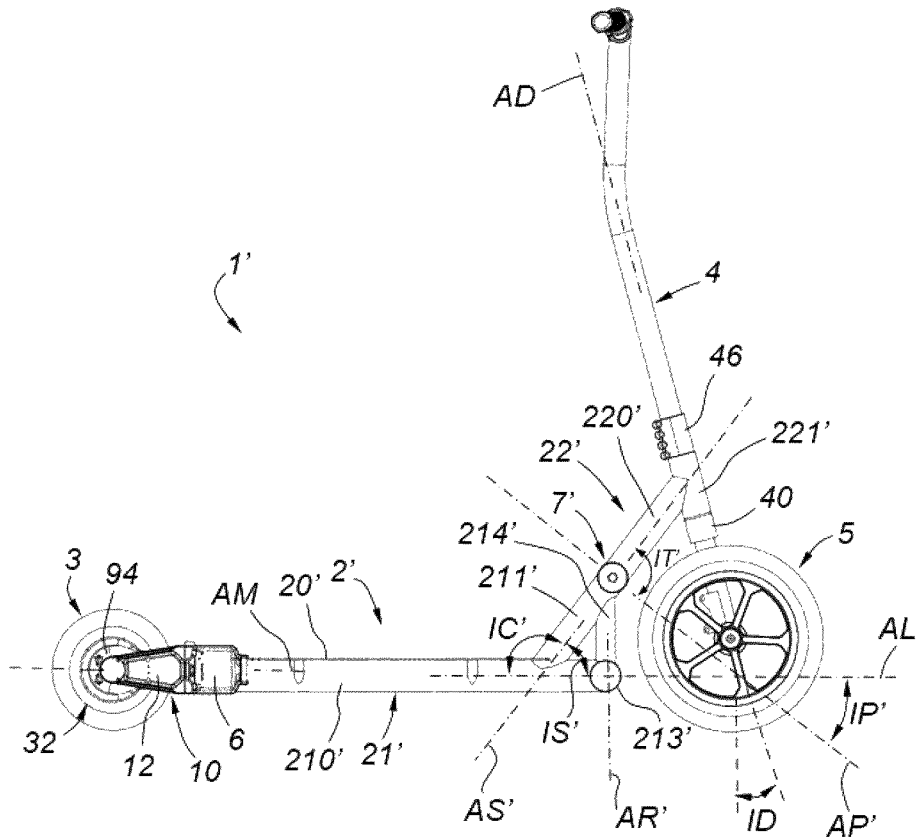
[Fig.17]
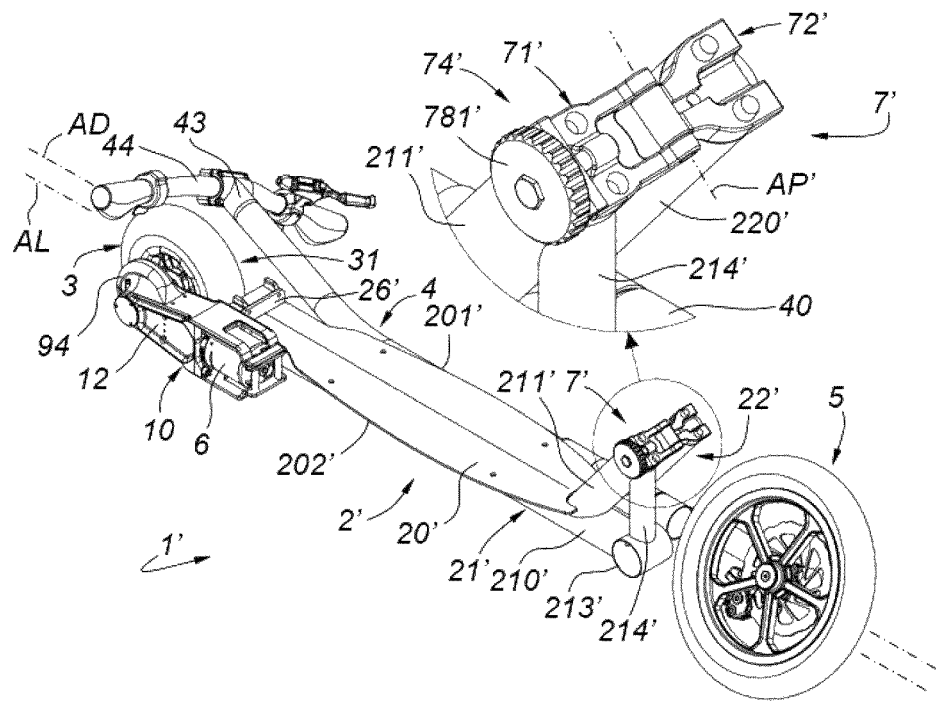

[Fig.18]
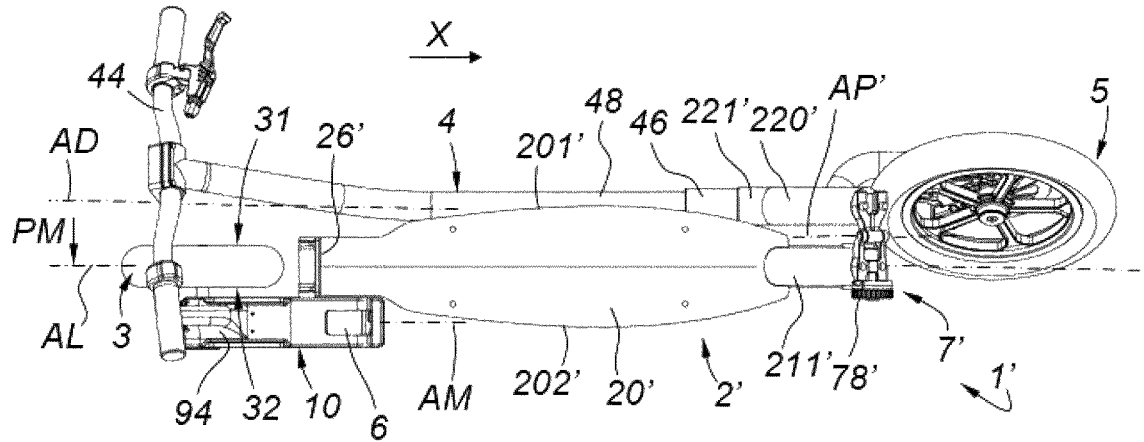
[Fig.19]
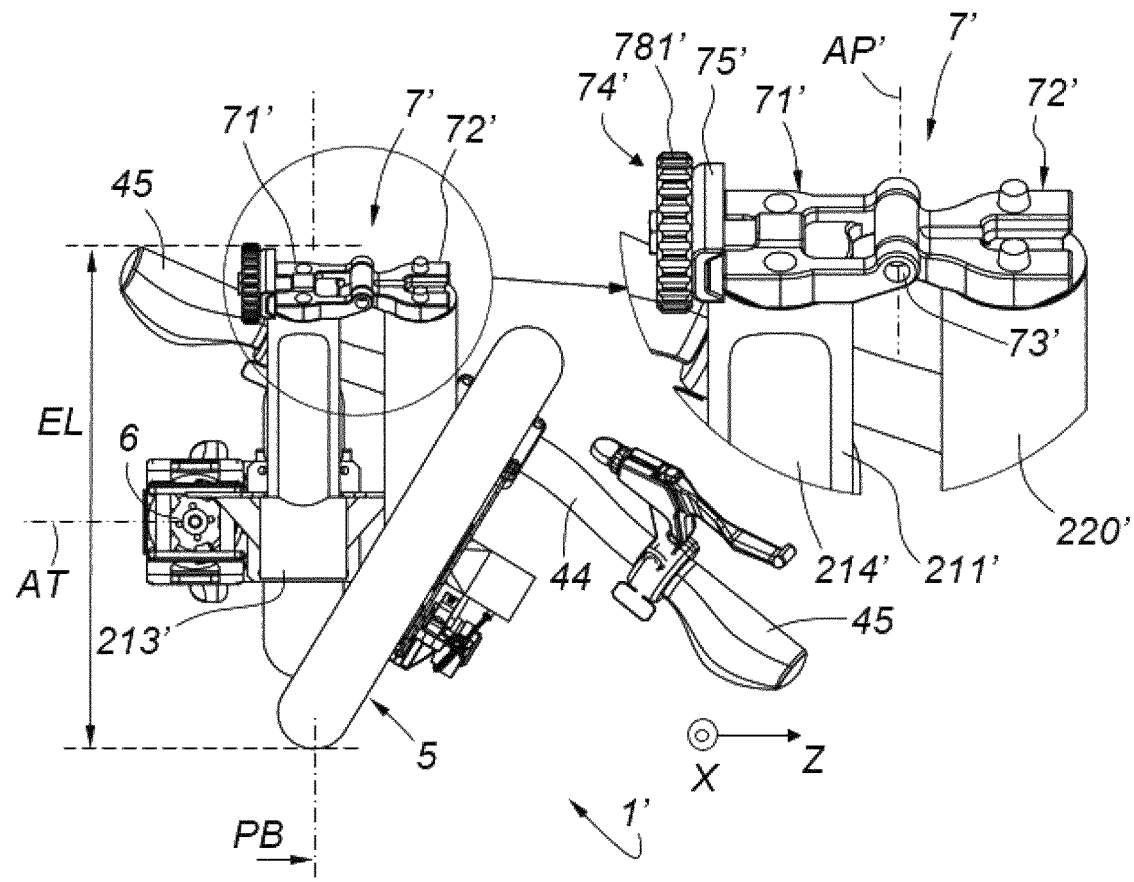

[Fig.20]
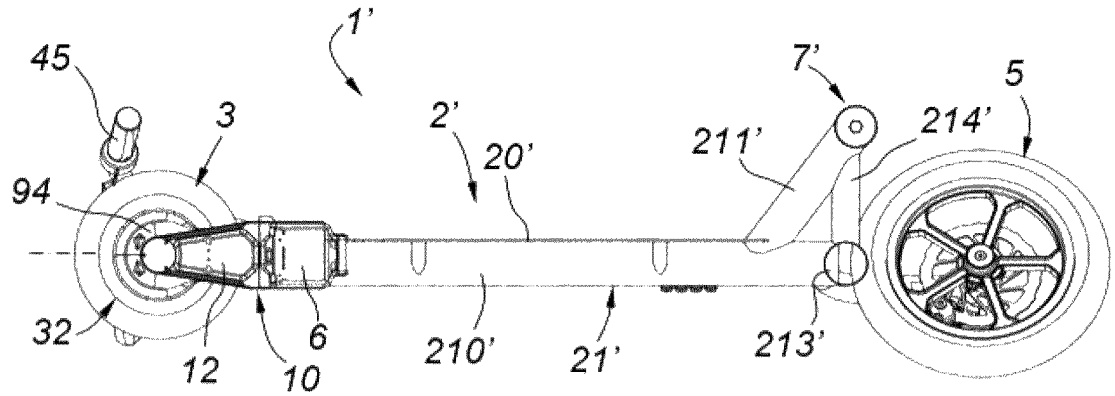
[Fig.21]
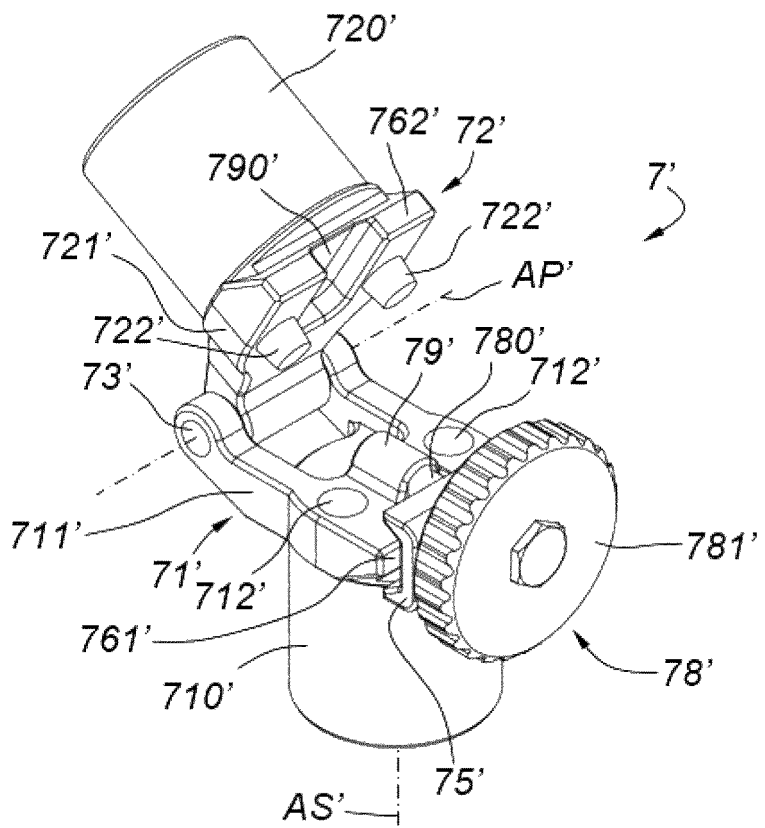

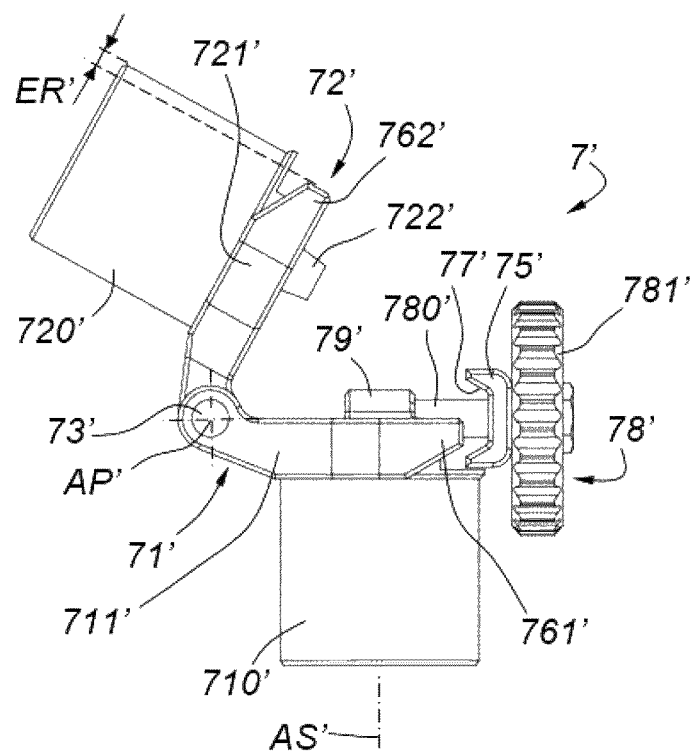
[Fig.22]

FOLDABLE SCOOTER

TECHNICAL FIELD

The disclosure relates to a scooter, and more specifically to a foldable scooter comprising a frame provided with a footboard and supporting a rear wheel rotating about a transverse axis, and a steering column equipped with a front wheel and pivotally mounted on the frame.

The disclosure finds a favorite, yet non-limiting, application for a motorized scooter, and in particular an electric scooter, that is to say a motorized scooter with an electric motor. However, the disclosure could be considered with a scooter that is not motorized.

BACKGROUND

In a known manner, the frame of a foldable scooter comprises a first portion supporting the rear wheel and a footboard, and a second portion pivotally supporting the steering column, wherein the first portion and the second portion of the frame are linked to one another by a swivel joint about a folding axis enabling a relative movability between:
- an unfolded configuration wherein the steering column projects upwards with respect to the footboard for use during a displacement, the steering column extending in a midplane orthogonal to the transverse axis and which includes a longitudinal axis passing through the front wheel and through the rear wheel and parallel to a direction of advance of the scooter when the latter progresses in a straight line; and
- a folded configuration wherein the steering column is folded down along the footboard.

In a first embodiment, known in particular from the documents FR3070155, FR3041321 and FR3050170, the folding axis is parallel to the transverse axis for a movability of the steering column from the unfolded configuration into the folded configuration wherein the steering column remains in the midplane and extends over the footboard and the rear wheel. In the folded configuration, the scooter is generally symmetrical with respect to the midplane and has a vertical bulk that results from stacking the steering column and the footboard in the midplane.

In a second embodiment, known in particular from the document FR3042467, the folding axis is contained in the midplane and is inclined with respect to the longitudinal axis, for a movability of the steering column from the unfolded configuration into the folded configuration wherein the steering column remains in the midplane and extends beneath the footboard and the rear wheel. In the folded configuration, the scooter is generally symmetrical with respect to the midplane and has a vertical bulk that results from stacking the steering column and the footboard in the midplane.

The state of the art may also be illustrated by the teaching of the document DE 20 2018 005767 U1 which discloses a foldable scooter which includes a frame comprising, on the one hand, a first portion supporting the rear wheel and a footboard and, on the other hand, a second portion pivotally supporting the steering column which carries the front wheel. This first portion and this second portion of the frame are linked to one another by a swivel joint about an axis of rotation which is included in the midplane and which is inclined downwards, and this swivel joint links the first portion and the second portion by two oblique (non-horizontal) contact surfaces crossed by this axis of rotation. Thus, starting from the unfolded configuration, the second portion pivots about this pivot axis by 180 degrees, and thus, in the folded configuration, the steering column is brought under the footboard, and lies in the midplane, with the same drawbacks as mentioned before, namely a vertical bulk that results from stacking the steering column and the footboard in the midplane.

SUMMARY

The present disclosure aims at solving all or part of the aforementioned drawbacks, by providing a foldable scooter which, when in the folded configuration, has a reduced vertical bulk.

Another aim of the disclosure is to provide a foldable scooter with a relatively concealed swivel joint so that the foldable scooter preserves an elegant line.

Another aim of the disclosure is to provide a foldable scooter that is practical and barely bothering when manually carried.

To this end, the disclosure provides a scooter of the foldable scooter type, comprising a frame and a steering column equipped with a front wheel and pivotally mounted on the frame about a steering axis, this frame comprising, on the one hand, a first portion supporting a rear wheel rotating about a transverse axis and a footboard and, on the other hand, a second portion pivotally supporting the steering column, wherein the scooter has a midplane orthogonal to the transverse axis and delimiting a first lateral side and a second lateral side opposite to one another, said midplane including a longitudinal axis passing through the front wheel and through the rear wheel and parallel to a direction of advance of the scooter when the latter progresses in a straight line, and the rear wheel has a first lateral face on said first lateral side and a second lateral face, opposite to the first lateral face, on said second lateral side,
- and wherein the first portion and the second portion of the frame are linked to one another by a swivel joint about a folding axis enabling relative movability thereof between:
- an unfolded configuration wherein the steering column projects upwards with respect to the footboard for use during a displacement, said steering column extending in the midplane; and
- a folded configuration wherein the steering column is folded down along the footboard;
- such a scooter being remarkable in that the swivel joint is arranged for movability of the steering column from the unfolded configuration into the folded configuration wherein the steering column is folded down on the first lateral side with respect to the midplane an extends at distance from said midplane, at least partially beneath the footboard, along a first lateral flange of the footboard located on said first lateral side and facing the first lateral face of the rear wheel.

Thus, the disclosure suggests bringing the steering column, in the folded configuration, on the right side (or conversely on the left side) of the footboard and of the rear wheel, asymmetrically with respect to the midplane, rather than leaving the steering column in the midplane once folded like in the prior art. Thus, in the folded configuration, the vertical bulk is reduced because there is no sacking in the midplane of the steering column and of the footboard. Furthermore, such a configuration allows for an easy manual carrying of the scooter folded this way.

According to one feature, the folding axis is offset on the first lateral side with respect to the midplane and it extends in an inclined manner with respect to the longitudinal axis with an angle of inclination comprised between 20 and 60 degrees Such a positioning and such an inclination of the folding axis allows achieving the desired tilting of the steering column on the right side (or conversely on the left side) of the footboard and of the rear wheel.

Advantageously, the angle of inclination is comprised between 30 and 50 degrees.

In a particular embodiment, the folding axis extends parallel to the midplane.

In a particular embodiment:
in the unfolded configuration, the steering axis is vertical or inclined with respect to the vertical by an angle comprised between 0 and 20 degrees; and
in the folded configuration, the steering axis is horizontal or inclined with respect to the horizontal by an angle comprised between 0 and 20 degrees.

In the context of the disclosure, by «vertical», reference is made to a vertical direction with respect to a horizontal ground on which the scooter is bearing or rolling with its front wheel and its rear wheel, and by «horizontal», reference is made to a horizontal plane parallel to the horizontal ground on which the scooter is bearing or rolling with its front wheel and its rear wheel. It should be noted that the longitudinal axis of the scooter is horizontal as it is parallel to this horizontal plane.

Advantageously, in the folded configuration, the steering axis is parallel, within 5 degrees, to the longitudinal axis.

Thus, in the folded configuration, the steering column and the footboard extend parallel to one another, next to one another, the steering column lying beneath the footboard, which represents a particularly practical configuration for carrying the scooter manually.

In an advantageous embodiment, the swivel joint is in the form of a hinge provided with a first hinge knuckle secured to an upper segment of the first portion of the frame and with a second hinge knuckle secured to a lower segment of the second portion of the frame, where the first hinge knuckle and the second hinge knuckle are hinged relative to one another by means of a pivot defining the folding axis, so that this swivel joint is pivotally movable between:
a closed position corresponding to the unfolded configuration of the scooter, wherein the upper segment of the first portion of the frame and the lower segment of the second portion of the frame are in alignment along a secondary axis contained in the midplane; and
an open position corresponding to the folded configuration of the scooter, wherein the upper segment of the first portion of the frame and the lower segment of the second portion of the frame are misaligned and are disposed side-by-side following pivoting about the folding axis.

According to one possibility, the secondary axis is inclined with respect to the longitudinal axis by a secondary angle comprised between 45 and 90 degrees, and in particular between 50 and 80 degrees.

According to another possibility, the folding axis is inclined with respect to the secondary axis by an intermediate angle which is comprised between 90 and 120 degrees.

Advantageously, the folding axis is inclined with respect to the secondary axis by an intermediate angle equal to 90 degrees, which enable the upper segment of the first portion of the frame and the lower segment of the second portion of the frame to be parallel in the unfolded configuration.

In a particular embodiment, the first portion has two successive tubular sections:

a central section on which the footboard is fastened and which extends along the longitudinal axis; and
an inclined section which projects from the central section and which extends along the secondary axis.

In a first embodiment, the central section has a front end which extends in an elbow, this elbow being, in turn, extended by the inclined section.

In a second embodiment, the first portion further comprises:
a front section fastened on a front end of the central section, at the front and at distance from a junction between the inclined section and the central section, and
a reinforcing section extending between the front section and the upper segment of the first portion, this reinforcing section extending between the secondary axis and the longitudinal axis to form a reinforcing structure with an inverted triangular geometry.

In this second embodiment, the frame has a reinforced structure at the front, with the reinforcing section which will form an inverted triangular geometry that is very suited for the distribution of forces.

In a particular embodiment, the swivel joint integrates a locking mechanism adapted to lock the swivel joint in the unlocked configuration.

According to one possibility, the locking mechanism comprises:
a movable locking element attached to one amongst the first hinge knuckle and the second hinge knuckle;
a complementary locking element attached to the other one amongst the first hinge knuckle and the second hinge knuckle, this movable locking element and this complementary locking element being adapted to cooperate together in a locking position to lock the swivel joint in the closed position, from an unlocking position wherein said movable locking element and said static locking element do not cooperate together so as to enable movability towards the open position; and
a manual actuator shaped so as to act on said movable locking element to bring and block said movable locking element in the locking position.

Advantageously, the locking mechanism comprises an elastic biasing member urging the movable locking element towards the unlocking position.

According to another possibility, the movable locking element comprises a hook and the complementary locking element is formed by a complementary element adapted to be hooked by this hook in the locking position.

According to another possibility, the manual actuator comprises a tapped rod provided with a gripping head and with a free end adapted to abut against the movable locking element, this manual actuator being displaceable by screwing so as to act on the movable locking element.

According to another possibility, the first hinge knuckle comprises a first clamping jaw clasping the upper segment of the first portion of the frame, and the second hinge knuckle comprises a second clamping jaw clasping the lower segment of the second portion of the frame.

According to one variant, the movable locking element is mounted on one amongst the first clamping jaw and the second clamping jaw, and the static locking element is mounted on the other one amongst the first clamping jaw and the second clamping jaw, and the manual actuator is mounted like the static locking element on the other one amongst the first clamping jaw and the second clamping jaw.

According to one variant, the movable locking element is mounted inside one amongst the first clamping jaw and the second clamping jaw, and the static locking element is mounted inside the other one amongst the first clamping jaw and the second clamping jaw.

In a particular embodiment, the movable locking element is mounted on a rod fastened inside one amongst the first clamping jaw and the second clamping jaw, and the static locking element is formed by a rod fastened inside the other one amongst the first clamping jaw and the second clamping jaw.

Advantageously, the rods cross the first clamping jaw and the second clamping jaw and also cross the upper segment of the first portion of the frame and the lower segment of the second portion of the frame.

Thus, these rods contribute to the rigidity of the set, by adding to the clamping of the jaws around the upper segment of the first portion of the frame and the lower segment of the second portion of the frame.

In one variant, the first hinge knuckle comprises a first sleeve intended to be fastened inside the upper segment of the first portion of the frame, and the second hinge knuckle comprises a second sleeve intended to be fastened inside the lower segment of the second portion.

In another variant, the first hinge knuckle has an upper face wherein at least two centering holes are formed, and the second element has a lower face from which at least two centering pads, advantageously conical-shaped, project where in the closed position of the swivel joint, the centering pads fit inside the respective centering holes, which have shapes complementary to those of the centering pads.

In another variant, the first hinge knuckle has a first locking lip, for example beveled-shaped, diametrically opposite to the pivot, and the second hinge knuckle has a second locking lip, for example beveled-shaped, and where in the closed position, these two locking lips are pressed against one another.

In another variant, the locking mechanism comprises the movable locking element which has a groove which has a shape complementary to the two locking lips when pressed against one another in the closed position, and thus, in the closed position and in the locking position, the movable locking element sets the two locking lips within its groove and thus locks the swivel joint in the closed position.

In another variant, the manual actuator comprises a tapped rod screwed into a threaded sheath integrated to the first hinge knuckle, and the second hinge knuckle has a groove in order to receive the threaded sheath in the closed position.

Advantageously, the steering column has an upper end secured to a handlebar extending transversely and provided with two grips respectively to the right and to the left and, in the folded configuration, the rear wheel and the two grips gave respectively three bearing points extending in the same plane enabling an upright bearing of the scooter on these three bearing points resting on a horizontal plane.

Thanks to folding of the steering column on a lateral side, it is thus possible to provide for three bearing points (a bearing point on the rear wheel and two bearing points to the right and to the left on the respective grips) to make the scooter hold upright on a horizontal ground, with the steering column and the footboard which lie substantially vertically and with the front wheel at the top. This shape is particularly advantageous for a barely bulky storage of the scooter on the ground.

Moreover, in an advantageous embodiment, in the folded configuration, the handlebar is inclined in a direction with respect to a base plane that is orthogonal to the transverse axis, and the front wheel is inclined in an opposite direction with respect to this same base plane.

These opposite inclinations of the handlebar and of the front wheel with respect to this base plane contribute to a reduced lateral bulk, advantageous when manually carried at the level of the steering column, with the base plane lying substantially horizontally.

The disclosure also concerns the feature according to which the rear wheel is carried by a rear transverse shaft extending along the transverse axis, and this rear transverse shaft is supported by a rear structure fastened to the frame and extending laterally on the second lateral side with respect to the midplane, and thus facing the second lateral face of the rear wheel, opposite to the first lateral face, so that the rear transverse shaft protrudes from the rear structure to support the rear wheel in a cantilevered manner, and that the first lateral face of the rear wheel is cleared.

Thus, the first lateral face of the rear wheel is cleared, which allows bringing the steering column, upon folding, the closest to this first lateral face of the rear wheel, for a reduced lateral bulk. Moreover, this feature allows clearing the first lateral side of the rear wheel (in this instance the lateral side opposite to the rear structure) which allows for a free access to the rear wheel, in particular to extract it easily and quickly in order to facilitate maintenance and repair tasks in an everyday environment.

In a particular embodiment, the scooter is motorized by comprising a motor equipped with a motor shaft driven in rotation about a motor axis and coupled to the rear wheel to drive it in rotation via a transmission system.

In an advantageous embodiment, the transmission system comprises:
  the rear transverse shaft having two opposite end portions, respectively a first end portion and a second end portion, the rear wheel being rotatably coupled on the second end portion of the rear transverse shaft;
  a gear system comprising a gear ring meshing with a gear pinion, this gear ring being rotatably coupled on the first end portion of the rear transverse shaft, and this gear pinion being rotatably coupled to the motor shaft, so that a rotation of the motor shaft is convertible by this gear system into a rotation of the rear transverse shaft and of the rear wheel about the transverse axis;
  the rear structure fastened to the frame and supporting at least the gear pinion and the first end portion of the rear transverse shaft, this rear structure extending laterally only on the second lateral side with respect to the midplane so that the second end portion of the rear transverse shaft protrudes from the rear structure to support the rear wheel in a cantilevered manner.

Thus, in this advantageous embodiment, it is provided to use a gear system allowing adapting the speed and torque conditions that are output by the motor in one single multiplication step, and therefore also allowing getting rid from component the servicing of which is considerable such as chains and belts, while allowing clearing the first lateral face of the rear wheel completely, which enables free access to the rear wheel on the first lateral (right or left) side, and which also allows bringing the steering column, during folding, the closest to this first lateral face, which allows for a reduced lateral bulk.

BRIEF DESCRIPTION OF THE DRAWINGS

Other features and advantages of the present disclosure will appear upon reading the detailed description hereinafter, of two non-limiting examples of implementation, made with reference to the appended figures wherein:

FIG. 1 is a schematic perspective front view of a first scooter, according to a first embodiment of the disclosure, in the unfolded configuration;

FIG. 2 is a schematic side vie, in this instance the right side, of the first scooter of FIG. 1 (not represented in its entirety);

FIG. 3 is a schematic perspective rear view of the first scooter of FIGS. 1 and 2 (not represented in its entirety);

FIG. 4 is a schematic front view of the first scooter of FIGS. 1 to 3 (not represented in its entirety);

FIG. 5 is a schematic perspective front view of the first scooter of FIGS. 1 to 4, in the folded configuration;

FIG. 6 is a schematic bottom view of the first scooter of FIGS. 1 to 5, in the folded configuration;

FIG. 7 is a schematic perspective view of the swivel joint of the first scooter, in the open position;

FIG. 8 is a schematic perspective view of the swivel joint of the first scooter, in the closed position;

FIG. 9 is a schematic side view of the swivel joint of the first scooter, in the closed position;

FIG. 10 is a schematic view of the swivel joint of the first scooter, in the closed position in the sectional plane X-X of FIG. 9;

FIG. 11 is a schematic top view of the swivel joint of the first scooter, in the closed position;

FIG. 12 is a schematic perspective view of the first scooter of FIGS. 1 to 6, in the folded configuration and in an upright situation bearing on three bearing points;

FIG. 13 is a schematic top view of the first scooter of FIGS. 1 to 6, in the folded configuration;

FIG. 14 is a schematic rear view of the first scooter of FIGS. 1 to 6, in the folded configuration and in a carry situation;

FIG. 15 is a schematic perspective front view of a second scooter, according to a second embodiment of the disclosure, in the unfolded configuration;

FIG. 16 is a schematic side view, in this instance the right side, of the second scooter of FIG. 15;

FIG. 17 is a schematic perspective front view of the second scooter of the FIGS. 15 and 16, in the folded configuration, with zooming on the swivel joint;

FIG. 18 is a schematic top view of the second scooter of FIGS. 15 to 17, in the folded configuration;

FIG. 19 is a schematic front view of the second scooter of FIGS. 15 to 18, in the folded configuration and in a carry situation, with zooming on the swivel joint;

FIG. 20 is a schematic side view, in this instance the right side, of the second scooter of FIGS. 15 to 19, in the folded configuration;

FIG. 21 is a schematic perspective view of the swivel joint of the second scooter, in the open position; and FIG. 22 is a schematic side view of the swivel joint of the second scooter, in the open position.

DETAILED DESCRIPTION OF THE DRAWINGS

The following description relates to a first scooter 1 and to a second scooter 1', which are respectively in accordance with a first embodiment of the disclosure and with a second embodiment of the disclosure. FIGS. 1 to 14 relate to the first scooter 1 and FIGS. 15 to 22 relate to the second scooter 1'. The first scooter 1 and the second scooter 1' may also be referred to respectively as the scooter 1 and the scooter 1'.

For the following description, the same reference numerals will be used to refer to parts and structural elements that are identical or similar for the first scooter 1 and the second scooter 1'. On the contrary, distinct reference numerals will be used to refer to parts and structural elements that are structurally (yet not necessarily functionally) distinct for the first scooter 1 and the second scooter 1'. In this instance, the first scooter 1 and the second scooter 1' differ by their frame 2, respectively 2', and their swivel joints 7, respectively 7', described hereinafter.

Referring to FIGS. 1 to 6 and 15 to 20, each of the first scooter 1 and second scooter 1' forms a foldable scooter.

The scooter 1 (respectively 1') is a two-wheel scooter, comprising:
- a frame 2 (respectively 2') provided with a footboard 20 (respectively 20') and supporting a rear wheel 3 rotating about a transverse axis AT,
- a steering column 4 equipped with a front wheel 5, this steering column 4 being pivotally mounted on the frame 2 (respectively 2').

The scooter 1 (respectively 1') has a midplane PM orthogonal to the transverse axis AT and delimiting two right and left lateral sides opposite to one another, namely a first lateral side (in the following description it will include the left side) and a second lateral side (in the following description it will include the right side). This midplane PM also includes a longitudinal axis AL of the scooter 1, such a longitudinal axis AL passing through the front wheel 5 and by the rear wheel 3 while being parallel to a direction of advance of the scooter 1 (respectively 1') when the latter progresses in a straight line. Thus, this longitudinal axis AL is orthogonal to the transverse axis AT. The midplane PM forms a plane of symmetry for the footboard 20 (respectively 20') and the two wheels 3, 5.

The frame 2 (respectively 20') comprises a tubular structure which, without this being restrictive, could be made of a metallic material, and this frame 2 (respectively 2') has two portions 21, 22 (respectively 21', 22'), respectively:
- a first portion 21 (respectively 21') which supports a rear wheel 3 and the footboard 20 (respectively 20'); and
- a second portion 22 (respectively 22'), extending the first portion 21 (respectively 21'), and which pivotally supports the steering column 4.

The following description relates to folding of the scooter 1 (respectively 1').

For the scooter 1 (respectively 1') to be foldable, the first portion 21 (respectively 21') and the second portion 22 (respectively 22') of the frame are linked to one another by a swivel joint 7 (respectively 7') about a folding axis AP (respectively AP') which enables folding and unfolding of the scooter 1 (respectively 1') about this folding axis AP (respectively AP'), this scooter 1 (respectively 1') then forming a foldable scooter.

Thus, pivoting of the second portion 22 (respectively 22') relative to the first portion 21 (respectively 21') translates into a tilting (or a pivoting) of the steering column 4 for folding/unfolding of the scooter 1 (respectively 1').

Hence, the swivel joint 7 (respectively 7') enables a relative movability between the two portions 21, 22 (respectively 21', 22') of the frame 2 (respectively 2') between:
- an unfolded configuration, shown in FIGS. 1 to 4 for the scooter 1 and in FIGS. 15 and 16 for the scooter 1', wherein the steering column 4 projects upwards with respect to the footboard 20 for use during a displacement, the steering column 4 then extending in the midplane PM; and
- a folded configuration, shown in FIGS. 5 and 6 for the scooter 1 and in FIGS. 17 to 20 for the scooter 1', wherein the steering column 4 is folded down on the left side, along the footboard 20 (respectively 20').

The following description concerns the shape of the frame 2 of the scooter 1.

The first portion 21 has two successive tubular sections:
- a central section 210 on which the footboard 20 is fastened; and
- an inclined section 211 which extends the central section 210 (projecting from the central section 210 upwards) and which forms an elbow directed upwards, with an elbow angle IC (shown in FIG. 2) comprised between 90 and 120 degrees, and in particular between 100 and 110 degrees.

Hence, the central section 210 has a front end which is extended by an elbow, having the elbow angle IC, this elbow being, in turn, extended by the inclined section 211. The central section 210 extends along the longitudinal axis AL of the scooter 1. Moreover, the inclined section 211 has an upper segment (which forms the upper segment of the first portion 21) on which the swivel joint 7 is mounted. This upper segment is rectilinear and extends linearly along a secondary axis AS which is inclined with respect to the longitudinal axis AL by a secondary angle IS (shown in FIG. 2), with the following relationship: IS=180-IC. Thus, this secondary angle IS is comprised between 60 and 90 degrees, and in particular between 70 and 80 degrees.

In turn, the second portion 22 has:
- a front section 220, tubular and with a curved shape, which extends the upper segment of the inclined section 211 of the first portion 21; and
- a steering tube 221, secured to an upper end of the front section 220, and inside which the steering column 4 is pivotally mounted.

In the unfolded configuration, the steering tube 221 extends about a steering axis AD which is vertical or inclined rearwards with respect to the vertical by a steering angle ID (shown in FIG. 2) comprised between 0 and 20 degrees, and thus the steering column 4 pivots about this steering axis AD. Thus, the steering column 4 is in pivot connection in the steering tube 221.

Whether for the scooter 1 or for the scooter 1', the steering column 4 has a lower end 40, below the steering tube 221, which is secured to an arm 41 (or alternatively to a fork); such an arm 41 (or alternatively such a fork) carrying a front transverse shaft 42 on which the front wheel 5 is pivotally mounted.

Whether for the scooter 1 or for the scooter 1', the steering column 4 has an upper end 43 secured to a handlebar 44 extending transversely with respect to the steering column 4, and where this handlebar 44 is provided with two grips 45 respectively right and left grips. There may also be provided a telescopic system 46 on the steering column 4, above the steering tube 221, enabling setting of the height of the steering column 4, and more specifically of the handlebar 44.

It should be noted that the front section 220 of the second portion 22 of the frame 2 has a lower segment (which forms the lower segment of the second portion 22 and which is opposite to the steering tube 221) on which the swivel joint 7 is mounted. This lower segment is rectilinear and extends linearly along the secondary axis AS in the unfolded configuration. In other words, in the unfolded configuration, the upper segment of the first portion 21 of the frame 2 and the lower segment of the second portion 22 of the frame 2 are in alignment along this secondary axis AS.

Moreover, and as shown in FIG. 2, the folding axis AP is inclined with respect to the secondary axis AS by an intermediate angle IT which is larger than 90 degrees, in particular comprised between 100 and 120 degrees, and in particular in the range of 110 degrees. Thus, in the folded configuration, the upper segment of the first portion 21 of the frame 2 and the lower segment of the second portion 22 of the frame 2 are disposed side-by-side but are not parallel, as shown in FIGS. 5, 12 and 13.

The following description concerns the shape of the frame 2' of the scooter 1'.

The first portion 21' has two successive tubular sections:
- a central section 210' on which the footboard 20' is fastened; and
- an inclined section 211' which projects from the central section 210' upwards, thereby defining some kind of an elbow with an elbow angle IC' (shown in FIG. 16) comprised between 100 and 130 degrees, and in particular between 110 and 120 degrees.

The central section 210' extends along the longitudinal axis AL of the scooter 1'. Moreover, the inclined section 211' is rectilinear and extends linearly along a secondary axis AS' which is inclined with respect to the longitudinal axis AL by a secondary angle IS' (shown in FIG. 16), with the following relationship: IS'=180-IC'. Thus, this secondary angle IS' is comprised between 50 and 80 degrees, and in particular between 60 and 70 degrees. Thus, this linear section 211' has an upper segment (which forms the upper segment of the first portion 21') on which the swivel joint 7' is mounted, wherein this upper segment is rectilinear and extends along this secondary axis AS'.

The central section 210' has a front end on which is fastened, for example by welding, a front section 213' which is in the form of a tube extending parallel to the transverse axis AT. The front section 213' is disposed at the front and at a distance from the junction between the inclined section 211' and the central section 210', and there is provided a reinforcing section 214' extending between the front section 213' and the upper section of the inclined section 211'. This reinforcing section 214' is in the form of a tube. This reinforcing section 214' is rectilinear and extends along a reinforcing axis AR' which is vertical, and possibly inclined, with respect to the vertical by substantially 5 degrees.

Also, the frame 2' of the scooter 1' has a reinforced structure at the front, with a vertical (or substantially vertical) reinforcing section 214' which extends between the secondary axis AS' and the longitudinal axis AL, thereby forming an inverted triangular geometry that is very suited for the distribution of forces for the scooter 1'.

To improve the manufacturing and welding process, the reinforcing section 214' is linked to the front section 213' which is in the form of a horizontal tube, which allows distributing possible stresses over a larger contact surface between the reinforcing section 214' and the front section 213'.

In turn, the second portion 22' has:
- a front section 220', tubular and with a rectilinear shape, which extends the upper segment of the inclined section 211' of the first portion 21'; and
- a steering tube 221', secured to an upper end of the front section 220', and inside which the steering column 4 is pivotally mounted.

In the unfolded configuration, the steering tube 221' extends about a steering axis AD which is vertical or inclined rearwards with respect to the vertical by a steering angle ID (shown in FIG. 16) comprised between 0 and 20 degrees, and thus the steering column 4 pivots about this steering axis AD. Thus, the steering column 4 is in pivot connection in the steering tube 221'.

Like with the scooter 1, the steering column 4 has a lower end 40, below the steering tube 221', which is secured to an arm 41 forming a one-arm fork (or alternatively, a two-arm fork); such an arm 41 (or alternatively, such a two-arm fork) carrying a front transverse shaft 42 on which the front wheel 5 is pivotally mounted.

It should be noted that, in the context of the two scooters 1, 1', the front fork therefore comprises a one-arm form, with the arm 41 having to carry alone the front wheel 5, and this arm 41 is advantageously disposed on the first lateral side, therefore opposite to the motor 6 and to the transmission system 8 described later on in the context of a motor drive of the scooter 1 or 1'. Hence, this configuration enables the lower end 40 of the steering column 4 to be closer to the frame 2 or 2', upon folding of the scooter 1 or 1', thereby allowing for more compactness in the folded configuration.

It should be note that the front section 220' of the second portion 22' of the frame 2' has a lower segment (which forms the lower segment of the second portion 22' and which is opposite to the steering tube 221') on which the swivel joint 7' is mounted. This lower segment is rectilinear and extends linearly along the secondary axis AS' in the unfolded configuration. In other words, in the unfolded configuration, the upper segment of the first portion 21' of the frame 2' and the lower segment of the second portion 22' of the frame 2' are in alignment along this secondary axis AS'.

Moreover, and as shown in FIG. 16, the folding axis AP' is inclined with respect to the secondary axis AS' by an intermediate angle IT which is equal to 90 degrees. Thus, in the folded configuration, the upper segment of the first portion 21 of the frame 2 and the lower segment of the second portion 22 of the frame 2 are disposed side-by-side and are parallel, and even the inclined section 211' and the front section 220' (both of them being rectilinear) are parallel, as shown in FIGS. 17, 18 and 20.

This configuration with the inclined section 211' and the front section 220' parallel in the folded configuration, because of the orthogonal orientation between the folding axis AP' and the secondary axis AS', is particularly advantageous for mechanical and compactness reasons.

More accurately, the scooter 1 (respectively 1') is therefore configurable between:
 the unfolded configuration wherein the steering tube 221 (respectively 221') and the steering column 4 extending about the steering axis AD which is substantially vertical, or at least which is vertical or inclined with respect to the vertical by an angle comprised between 0 and 20 degrees;
 the folded configuration wherein the steering tube 221 (respectively 221') and the steering column 4 extend about the steering axis AD which has tilted so as to be substantially horizontal, or at least which is horizontal or inclined with respect to the horizontal by an angle comprised between 0 and 20 degrees.

Advantageously, in the folded configuration, the steering axis AD is parallel (within five degrees) to the longitudinal axis AL, so that the steering column 4 extends parallel to this longitudinal axis AL.

Although not illustrated, it is advantageous to provide for a means for blocking the scooter 1 (respectively 1') in the folded configuration, in order to avoid it being inadvertently unfolded in particular when it is manually transported or when it is set on the ground.

As regards the swivel joint 7 (respectively 7'), the latter is in the form of a hinge provided with a first hinge knuckle 71 (respectively 71') secured to the upper segment of the first portion 21 (respectively 21') and with a second hinge knuckle 72 (respectively 72') secured to the lower segment of the second portion 22 (respectively 22'), where the first hinge knuckle 71 (respectively 71') and the second hinge knuckle 72 (respectively 72') are hinged relative to one another by means of a pivot 73 (respectively 73') (that is to say a physical axis) defining the folding axis AP (respectively AP').

Thus, this swivel joint 7 (respectively 7') is pivotally movable between:
 a closed position corresponding to the unfolded configuration of the scooter 1 (respectively 1'), wherein the upper segment of the first portion 21 (respectively 21') and the lower segment of the second portion 22 (respectively 22') are in alignment along the secondary axis AS (respectively AS'); and
 an open position corresponding to the folded configuration of the scooter 1 (respectively 1'), wherein the upper segment of the first portion 21 (respectively 21') and the lower segment of the second portion 22 (respectively 22') are misaligned and are disposed side-by-side following pivoting about the folding axis AP (respectively AP').

As shown in FIGS. 5 and 6 and in FIGS. 17 and 18, the swivel joint 7 (respectively 7') is arranged for movability of the steering column 4 of the unfolded configuration towards the folded configuration wherein the steering column 4 is folded down on the first lateral side (for reminder, the left side in the figures) with respect to the midplane PM and extends at a distance from this midplane PM (in other words off the midplane PM), at least partially below the footboard 20 (respectively 20'), along a first lateral flange 201 (respectively 201') of the footboard 20 (respectively 20') located on the first lateral side and facing the first lateral face 31 of the rear wheel 3. This footboard 20 (respectively 20') also has a second lateral flange 202 (respectively 202') located on the second lateral side, and therefore opposite to the first lateral flange 201 (respectively 201') with respect to the midplane PM, this second lateral flange 202 (respectively 202') being cleared and free in the folded configuration.

To this end, the folding axis AP (respectively AP') is offset on the first lateral side with respect to the midplane PM, and it extends, on the one hand, parallel to the midplane PM and, on the other hand, in an inclined manner with respect to the longitudinal axis AL with an angle of inclination IP (respectively IP') (shown in FIG. 2 and in FIG. 16), comprised between 20 and 60 degrees, and in particular comprised between 30 and 50 degrees.

Thus, this swivel joint 7 (respectively 7') allows folding the scooter 1 (respectively 1'), by switching from the unfolded configuration into the folded configuration, in one single movement, namely a rotational movement of the steering column 4 about the folding axis AP (respectively AP') defined by the swivel joint 7 (respectively 7').

Moreover, as shown in FIGS. 12 and 13 for the scooter 1 (and which also applies to the scooter 1'), in the folded configuration, the rear wheel 3 has a bearing point 35 (the farthest point of the rear wheel opposite to the front wheel 5) and the two grips 45 have two bearing points 47, 48 respectively to the right and to the left, and these three bearing points 35, 47, 48 extend in the same bearing plane PA, possibly provided that the steering column 4 is stowed in the case where a telescopic system 46 is present. In other words, these three bearing points 35, 47, 48 are coplanar, and this bearing plane PA is substantially orthogonal to the longitudinal axis AL. As shown in FIG. 12, this coplanarity of these bearing points 35, 47, 48 enables an upright bearing of the scooter 1 on these three bearing points 35, 47 resting on a horizontal ground (in the same manner as a tripod), with the longitudinal axis AL and the steering axis AD substantially vertical (a vertical axis Z being illustrated in this FIG. 12), and therefore with the steering column 4 and the footboard 20 (or 20') which are substantially vertical and with the front wheel 5 at the top.

Moreover, in the folded configuration, it is possible to carry the scooter 1 (respectively 1') with the hand by placing the hand on the steering column 4, at the level of a central portion 48 shown in FIGS. 12 and 13 and in FIG. 18, and with the scooter 1 (respectively 1') which is laid down, that is to say with the longitudinal axis AL and the steering axis AD substantially horizontal (a horizontal axis X being illustrated in FIGS. 13 and 14, as well as in FIG. 18), and therefore with the steering column 4 and the footboard 20 (respectively 20') which are substantially horizontal and with the front wheel 5 which is at the rear (conversely at the front) of the carrier and the rear wheel 3 at the front (conversely at the rear) of the carrier.

As shown in FIG. 14 for the scooter 1 and in FIG. 19 for the scooter 1', in the folded configuration, the handlebar 44 is inclined in one direction with respect to the base plane PB which is orthogonal to the transverse axis AT (for reminder, the axis of rotation of the rear wheel 3) and which passes through the center of gravity G of the folded scooter 1. Similarly, the front wheel 5 is inclined in an opposite direction with respect to this base plane PB so that, viewed from the rear (like in FIG. 12) or from the front (like in FIG. 19), the handlebar 44 and the front wheel 5 form together a «X»-like shape. When carried as described in the paragraph hereinabove, the central portion 48 is located vertically above the center of gravity G, and the scooter 1 (respectively 1') is balanced naturally with the base plane PB horizontally and therefore with the transverse axis AT vertically (a vertical axis Z being illustrated in this FIG. 14 and in this FIG. 19).

Thanks to the opposite inclinations of the handlebar 44 and of the front wheel 5 in the folded configuration, during such carrying, the scooter 1 (respectively 1') has a lateral balance between the right and the left, as well as a lateral bulk EL that is reduced, and thus the handlebar 44 and the front wheel 5 do not bother the carrier. Moreover, the space between the front wheel 5 and the rear wheel 3 is free for the passage of the legs of the carrier along the steering column 4.

The following description relates to the structure of the swivel joint 7 of the scooter 1.

Referring to FIGS. 7 to 11, it should be noted that the first hinge knuckle 71 comprises a first clamping jaw 710 intended to clasp the upper segment of the first portion 21, and the second hinge knuckle 72 comprises a second clamping jaw 720 intended to clasp the lower segment of the second portion 22.

The first clamping jaw 710 comprises a slit clamping collar, that is to say delimiting a rectilinear slot 711 over the height thereof, and equipped with one or several clamping screw(s) 712 which cross the slot 711 in order to enable clamping/unclamping of the slot 711 and thus enable clamping/unclamping around the upper segment of the first portion 21; such an upper segment being tubular and having a circular section.

Similarly, the second clamping jaw 720 comprises a slit clamping collar, that is to say delimiting a rectilinear slot 721 over the height thereof, and equipped with one or several clamping screw(s) 722 which cross the slot 721 in order to enable clamping/unclamping of the slot 721 and thus enable clamping/unclamping around the lower segment of the second portion 22; such a lower segment being tubular and having a circular section.

The first clamping jaw 710 and the second clamping jaw 720 are provided respectively with a first housing 713 and with a second housing 723 projecting outwardly from the respective collars, and receiving the physical axis forming the pivot 73 at the bottom. These two housings 713, 723 are disposed diametrically opposite to the respective slots 711, 721 with respect to the secondary axis AS. Advantageously, the two clamping jaws 710, 720 are identical, and they are mounted head-to-tail or symmetrically so as to receive the pivot 73 together.

In the closed position, the two clamping jaws 710, 720 are centered on the secondary axis AS, with the slots 711, 721 which extend parallel to the secondary axis AS, and furthermore the first clamping jaw 710 has a circumferential upper face 714 which bears on a circumferential lower face 724 of the second clamping jaw 720 in a bearing plane PA orthogonal to the secondary axis AS.

The pivot 73 extends about the folding axis AP which extends in an inclined manner with respect to the bearing plane PA with an angle of inclination IA (shown in FIG. 9), comprised between 10 and 40 degrees, and in particular comprised between 20 and 30 degrees.

The swivel joint 7 is also intended to integrate a locking mechanism 74 adapted to lock the swivel joint 7 in the closed position, where this locking mechanism 74 could be manually handled so as to be able to open and close the swivel joint 7 during the folding and unfolding operations.

Referring to FIGS. 7 to 11, the locking mechanism 74 comprises:

a movable locking element formed by a hook 75 hanging on an upper rod 750 fastened inside the second clamping jaw 720;

a static locking element formed by a lower rod 76 fastened inside the first clamping jaw 710, the hook 75 and the lower rod 76 being adapted to cooperate together in a locking position (as shown in FIG. 10) to lock the swivel joint 7 in the closed position;

an elastic biasing member formed by a spring 77 mounted inside the second clamping jaw 720 and urging the hook 75 towards an unlocking position (as shown in FIG. 7) wherein the hook 75 and the lower rod 76 do not cooperate together to enable movability of the swivel joint 7 towards the open position; and a manual actuator 78 mounted on the first clamping jaw 710 and shaped so as to act on the hook 75 against the spring 77 to bring and block the hook 75 in the locking position.

The upper rod 750 extends orthogonally to the secondary axis AS and therefore parallel to the bearing plane PA, and it also extends parallel to the clamping screw(s) 722. The hook 75 is pivotally mounted on the upper rod 750 and protrudes from the circumferential lower face 724 of the second clamping jaw 720.

The hook 75 terminates in a notch adapted to cooperate with the lower rod 76; this lower rod 76 forming a complementary element adapted to be hooked by the notch of said hook 75 in the locking position. The lower rod 76 extends parallel to the upper rod 750, and it also extends parallel to the clamping screw(s) 712.

The manual actuator 78 comprises a tapped rod 780 screwed into a threaded hole provided on the first clamping jaw 710 along a direction parallel to the bearing plane PA and orthogonal to the lower rod 76. This tapped rod 780 is provided with a gripping head 781 disposed outside the first clamping jaw 710 in order to allow grasping thereof to screw/unscrew the tapped rod 780. This tapped rod 780 is also provided with a free end 782 disposed outside the first clamping jaw 710, opposite the lower rod 76, and adapted to abut against the hook 75 to hold it blocked against the lower rod 76 (as shown in FIG. 10). Thus, the locking mechanism 74 is locked and the swivel joint 7 is blocked in the closed position.

The direction of advance of the tapped rod 780 is perpendicular to the lower rod 76, which implies that when the swivel joint 7 is closed and therefore in the unfolded configuration, the rotation of the tapped rod 780 closes the hook 75 against the lower rod 76 while ensuring closure of the set and while making opening thereof impossible thanks to the remaining force that is exerted, similar to a screwed attachment. The two rods 750, 76 are disposed so that the hook 75 joins them by using the separating forces of the structure in the same application line.

To unlock the locking mechanism 74, and thus open the swivel joint 7, all it needs is to unscrew the manual actuator 78 and the spring 77 acts on the hook 75 to make it move backwards and to separate from the lower rod 76, thereby enabling folding of the scooter 1.

Advantageously, the rods 750, 76 cross the two clamping jaws 710, 720 (as described hereinabove) and also cross the upper segment of the first portion 21 and the lower segment of the second portion 22.

In other words, when mounting the first hinge knuckle 71:
the first clamping jaw 710 is clamped around the upper segment of the first portion 21 so as to align lower orifices formed in both the first clamping jaw 710 and the upper segment of the first portion 21; and afterwards
the lower rod 76 is fitted through these lower orifices so as to be secured to both the first clamping jaw 710 and the upper segment of the first portion 21;
the lower rod 76 is finally blocked in position for example by means of a nut or a cotter pin.

Similarly, when mounting the second hinge knuckle 72:
the second clamping jaw 720 is clamped around the lower segment of the second portion 22 so as to align upper orifices formed in both the second clamping jaw 720 and the lower segment of the second portion 22; and afterwards
the upper rod 750 is fitted through these upper orifices so as to be secured to both the second clamping jaw 720 and the lower segment of the second portion 22;
the upper rod 750 is finally blocked in position for example by means of a nut or a cotter pin.

Afterwards, once the two hinge knuckles 71, 72 are mounted, the pivot 73 is set in place to rotatably couple the two hinge knuckles 71, 72. Furthermore, the hook 75 is set in place on the upper rod 750, the spring 77 is also set in place inside the second clamping jaw 720 as well as the manual actuator 78 which crosses both the first clamping jaw 710 and the upper segment of the first portion 21.

Thus, this locking mechanism 74 ensures the rigidity of the connection between the first portion 21 and the second portion 22 of the frame 2 in the unfolded position, for an enhanced safety in use. The rods 750, 76 cross the two clamping jaws 710, 720 as well as the first portion 21 and the second portion 22 of the frame 2 contribute to the rigidity of the set by a redundant system (as it adds to the clamping of the jaws 710, 720 around the portions 21, 22 of the frame) thereby ensuring an additional safety at the same time.

In a non-illustrated variant, the locking mechanism 74 may be mounted outside the structure while preserving the joining concept thanks to a hook and with blocking by means of a manual actuator movable in screwing/unscrewing.

The following description relates to the structure of the swivel joint 7' of the scooter 1'.

Referring to FIGS. 21 and 22, the first hinge knuckle 71' comprises a cylindrical shaped first sleeve 710' intended to be fastened, in particular by welding, inside the upper segment of the first portion 21', and the second hinge knuckle 72' comprises a cylindrical-shaped second sleeve 720' intended to be fastened, in particular by welding, inside the lower segment of the second portion 22.

These two sleeves 710', 720' allow positioning the hinge knuckles 71', 72' in portions 21', 22' with tubular structures, while promoting a suppression of backlashes or movements. These two sleeves 710', 720' also increase the thickness between the contact areas of the portions 21', 22', which optimizes the distribution of the mass in the most loaded area. Thus, it is possible to keep for the frame 2', at the level of the swivel joint 7', a very light tubular structure with the addition of material in the most stressed area where welds would also be located The first hinge knuckle 71' comprises, secured to the first pad 710', a first element 711' forming a hinge knuckle body, and the second hinge knuckle 72' comprises, secured to the second pad 720', a second element 721' forming a hinge knuckle body, where this first element 711' and this second element 721' are provided with respective housings receiving thereinside the physical axis forming the pivot 73'.

The first element 711' has an upper face wherein two centering holes 712' are formed, and the second element 721' has a lower face from which two centering pads 722', advantageously conical-shaped, project. In the closed position of the swivel joint 7', the upper face of the first element 711' and the lower face of the second element 721' bear against one another in a bearing plane orthogonal to the secondary axis AS'.

The pivot 73' extends about the folding axis AP' which extends parallel to the bearing plane mentioned in the paragraph hereinabove.

Moreover, in the closed position of the swivel joint 7', the centering pads 722' fit inside the respective centering holes 712', which have shapes complementary to those of the centering pads 722'. The presence of the two centering pads 722' allows enlarging the contact surface between the two hinge knuckles 71', 72' in the closed position. In this manner, the deformation due to bending and to any shear stress present at the contact of the two hinge knuckles 71', 72' is blocked more effectively by these two centering pads 722'.

The first element 711' also has a beveled-shaped first locking lip 761' which is diametrically opposite to the pivot with respect to the secondary axis AS'. The second element 721' also has a beveled-shaped second locking lip 762' which is diametrically opposite to the pivot with respect to the secondary axis AS' in the closed position. Also, in the closed position, these two locking lips 761', 762' are pressed against one another in the bearing plane.

The swivel joint 7' is also intended to integrate a locking mechanism 74' adapted to lock the swivel joint 7' in the closed position, where this locking mechanism 74' could be manually handled so as to be able to open and close the swivel joint 7' during the folding and unfolding operations.

Referring to FIGS. 21 and 22, the locking mechanism 74' comprises:
a movable locking element 75' attached to the first hinge knuckle 71';
a complementary locking element formed by the second locking lip 762' and which is therefore attached to the second hinge knuckle 72'; and a manual actuator 78' shaped so as to act on this movable locking element 75'.

The movable locking element 75' and the second locking lip 762' are adapted to cooperate together in a locking position to lock the swivel joint 7' in the closed position, from an unlocking position (shown in FIGS. 21 and 22) wherein this movable locking element 75' and this second locking lip 762' do not cooperate together to enable movability towards the open position.

More specifically, the movable locking element 75' has a groove 77' which has a shape complementary to the two locking lips 761', 762' when pressed against one another in the closed position, and thus, in the closed position and in the locking position, the movable locking element 75' sets the two locking lips 761', 762' within its groove 77' and thus locks the swivel joint 7' in the closed position.

The manual actuator 78' is intended to displace the movable locking element 75' and thus bring and block this movable locking element 75' in the locking position by bringing it close to the two locking lips 761', 762', and conversely bring the movable locking element 75' away from the two locking lips 761', 76 so as to lie in the unlocked position and enable opening of the swivel joint 7'.

The manual actuator 78' comprises a tapped rod 780' screwed into a threaded sheath 79' integrated to the first hinge knuckle 71', and more specifically integrated to the first element 711', projecting from its upper face. This threaded sheath 79' extends between the two centering holes 712'. A groove 790' is provided in the lower face of the second element 721' in order to receive the threaded sheath 79' in the closed position, and therefore not disturb bearing in the bearing plane.

The tapped rod extends along a direction parallel to the plane PA and orthogonal to the folding axis AP'. This tapped rod 780' crosses the movable locking element 75' and is provided with a gripping head 781' disposed outside in order to allow grasping thereof to screw/unscrew the tapped rod 780', and thus displace the movable locking element 75'. Thus, the locking mechanism 74' is adapted to lock and block the swivel joint 7' in the closed position.

As shown in FIG. 22, the two locking lips 761', 762' are radially set back with respect to the respective sleeves 710', 720', as highlighted in FIG. 22 by the radial spacing ER' associated to the second locking lip 762'. Thus, in the open position, the movable locking element 75' could remain bearing on top the first sleeve 710', as shown in FIG. 22, which enables this movable locking element 75' not to turn about the tapped rod 780' and therefore remain in alignment with the first locking lip 761'. Also, it is not necessary to align this movable locking element 75' again during the opening/closing and locking/unlocking operations.

The following description relates to the motor drive of the scooter 1 (respectively 1').

Indeed, in the example illustrated in the Figures, the scooter 1 (respectively 1') is a motorized scooter and more specifically an electric scooter or a scooter with an electric drive. To this end, the scooter 1 (respectively 1') comprises a motor 6 coupled to the rear wheel 3 via a transmission system 8 to drive it in rotation about the transverse axis AT, the rear wheel 3 thereby forming the drive wheel adapted to propel the scooter 1.

The motor 6 is fixedly mounted, for example by bolting, on a plate 26 (respectively 26') secured to the frame 2 (respectively 2'), and more specifically a plate 26 (respectively 26') which is secured to a rear end of the first portion 21 (respectively 21') of the frame 2 (respectively 2').

This plate 26 (respectively 26') extends in a vertical plane, orthogonal to the longitudinal axis AL of the scooter 1 (respectively 1'). This plate 26 (respectively 26') has two opposite faces, namely:
- a front face directed forwards (front wheel 5 side) and from which the motor 6 projects; and
- a rear face directed rearwards (rear wheel 3 side).

This plate 26 (respectively 26') is asymmetric with respect to the midplane PM of the scooter 1 by having a lateral portion that protrudes laterally on the second lateral side (for reminder, the right side in the Figures) with respect to the midplane PM. Hence, this lateral portion protrudes on the second lateral side, beyond the frame 2 (respectively 2') and even beyond the footboard 20 (respectively 20'), while being located at least partially beneath this same footboard 20 (respectively 20').

Also, the motor 6 is fastened on this lateral portion and thus this motor 6 extends on the second lateral side, next to the rear end of the first portion 21 (respectively 21') of the frame 2 (respectively 2'). Hence, the motor 6 extends at the rear of the footboard 20 (respectively 20'), and partially beneath the footboard 20 (respectively 20'), while protruding partially laterally to the right of the footboard 20 (respectively 20').

In the case of the scooter 1, and as shown in FIGS. 1, 2, 3 and 5, the footboard 20 features a rear step 27, in protrusion, to enable an arrangement of the motor 6 partially beneath this rear step 27.

In the case of the scooter 1', and as shown in FIGS. 15 and 16, the footboard 20' is flat, with no raised portion, at the level of its rear end, so that the motor 6 extends partially below the footboard 20' and partially above the footboard 20'.

The motor 6 is equipped with a motor shaft (not illustrated) driven in rotation about a motor axis AM parallel to the longitudinal axis AL, where this motor shaft crosses the plate 26 (respectively 26') to project beyond the rear face of the plate 26 (respectively 26').

As regards the transmission between the motor shaft and the rear wheel 3, the transmission system 8 comprises a gear system (not illustrated as it is hidden in the Figures by the casing 94) forming a bevel gear with a helical or spur toothing provided with a gear ring meshing with a gear pinion.

The gear pinion is secured to a pinion shaft extending coaxially with and in the continuation of the motor shaft, and this pinion shaft is rotatably coupled to the motor shaft via an elastomeric coupling 93 (shown in FIGS. 5 and 6). Thus, the rotation of the motor shaft causes the rotation of the pinion shaft and therefore of the gear pinion about the motor axis AM parallel to the longitudinal axis AL.

Instead of the elastomeric coupling 93, it could be considered to provide for other transmission means between the pinion shaft and the motor shaft, such as for example a constant-velocity joint, a transmission joint, a universal joint, or a preliminary gear system (in addition to the aforementioned gear system).

The transmission system 8 further comprises a rear transverse shaft extending along the transverse axis AT orthogonal to the motor axis AM. This rear transverse shaft has two opposite end portions, namely:
- a first end portion rotatably coupled to the gear ring, this gear ring being therefore carried by this first end portion;
- a second end portion rotatably coupled to the rear wheel 3, this rear wheel 3 being therefore carried by this second end portion.

Thus, a rotation of the motor shaft about the motor axis AM is convertible by this gear system into a rotation of the rear transverse shaft and of the rear wheel 3 about the transverse axis AT. Moreover, this gear system has a transmission ratio between the motor shaft at the input and the rear transverse shaft at the output which is fixed and comprised between 1:2 and 1:5.

The transmission system 8 further comprises a rear structure 10 fastened to the frame 2 and supporting the gear system, the rear transverse shaft and the rear wheel 3.

It should also be noted that the rear wheel 3 has two opposite lateral faces 31, 32, namely:
- a first lateral face 31 on the first lateral side (for reminder, the left side in the Figures) with respect to the midplane PM, and
- a second lateral face 32 on the second lateral side (for reminder, the right side in the Figures) with respect to the midplane PM.

These lateral faces 31, 32 form sidewalls to the right and to the left of the rear wheel 31, which border a circumferential tread 33.

This rear structure 10 extends laterally only on the second lateral side with respect to the midplane PM, the same applying to the motor 6 and the lateral portion of the plate 26 (respectively 26') which also extend on this second lateral side. This rear structure 10 extends partially facing the second lateral face 32 of the rear wheel 3.

This rear structure 10 is fastened on the plate 26 (respectively 26'), and more specifically on the lateral portion, and projects from its rear face. Thus, the motor 6 and the rear structure 10 extend on either side of this plate 26 (respectively 26'). For example, this rear structure 10 is fastened by bolting, screwing or welding on the plate 26 (respectively 26'), this rear structure 10 could also be integral with the plate 26 (respectively 26').

This rear structure 10 comprises two covers 11, 12, respectively an inner cover 11 and an outer cover 12, extending opposite one another and spaced apart from one another. The inner cover 11 extends inside along the rear wheel 3 and facing the second lateral face 32 of the rear wheel 3, whereas the outer cover 12 extends outside, at a longer distance from the second lateral face 32 of the rear wheel 3 in comparison with the inner cover 11.

These two covers 11, 12 extend parallel to the motor axis AM and are orthogonal to the transverse axis AT. These two covers 11, 12 extend from the rear face of the plate 26 (respectively 26'), on which they are fastened.

This rear structure 10 also comprises a tray extending between the two covers 11, 12. This tray extends orthogonally to the motor axis AM and is located at a distance from the plate 26 (respectively 26'). Thus, this rear structure 10 has a «H»-like structure with the two covers 11, 12 parallel to one another and the tray joining the two covers 11, 12 together. This tray is fastened on the two covers 11, 12, for example by screwing, bolting or welding, this tray could also be integral with the two covers 11, 12.

This tray is provided with an orifice, called front orifice, crossed by the pinion shaft secured to the gear pinion. This front orifice supports at least one rolling bearing wherein the pinion shaft is rotatably mounted. Thus, the pinion shaft is carried by this tray and is guided in rotation in its front orifice.

The elastomeric coupling 93 is located between the tray and the plate 26 (respectively 26'), and extends between the two covers 11, 12.

The two covers 11, 12 have respective orifices, called rear orifices, which are formed facing each other and both of which are crossed by the first end portion of the rear transverse shaft. These two rear orifices support respective rolling bearings wherein the first end portion of the rear transverse shaft is rotatably mounted. Thus, the rear transverse shaft is carried by these two covers 11, 12 and is guided in rotation in their rear orifices.

The two covers 11, 12 surround the gear pinion and the gear ring, and the first end portion of the rear transverse shaft extends mainly between the two covers 11, 12 of the rear structure 10, whereas the second end portion of the rear transverse shaft protrudes from the rear structure 10, and more specifically protrudes from the inner cover 11 to support the rear wheel 3 in a cantilevered manner.

The gear ring is rotatably secured to the rear transverse shaft by means of a key coupling the gear ring to the first end portion of the rear transverse shaft.

The rear wheel 3 extends at a fixed distance with respect to the inner cover 11 of the rear structure 10, and this rear wheel 3 is carried in a cantilevered manner by the second end portion of the rear transverse shaft. It should be noted that the second lateral face 32 of the rear wheel 3 is covered by the rear structure 10 and by the gear system, whereas the first lateral face 31 of the rear wheel 3 is completely cleared and access-free, thanks to this cantilevered mounting.

The rear wheel 3 has a hub which is crossed by the second end portion and which is rotatably secured to this second end portion of the rear transverse shaft by means of a key coupling the hub to the second end portion of the rear transverse shaft.

Instead of the key coupling between the rear transverse shaft and the hub of the rear wheel, it could be considered to provide for other rotational coupling means, such as for example a flange coupling, a shear pin coupling, a jaw coupling, a collar coupling, . . . .

There is provided a casing 94 fastened on the rear structure 10 and comprising:
- a circular-shaped rear portion which wraps the gear ring over the entire circumference thereof, and
- a front portion which extends the rear portion and which wraps the gear pinion up to the tray 13.

The invention claimed is:

1. A foldable scooter, comprising: a frame and a steering column equipped with a front wheel and pivotally mounted on said frame about a steering axis, the frame comprising a first portion supporting a rear wheel rotating about a transverse axis and a footboard and a second portion pivotally supporting the steering column, wherein the foldable scooter has a midplane orthogonal to the transverse axis and delimiting a first lateral side and a second lateral side opposite to one another, said midplane including a longitudinal axis passing through the front wheel and through the rear wheel and parallel to a direction of advance of the foldable scooter when the foldable scooter progresses in a straight line, and the rear wheel has a first lateral face on said first lateral side and a second lateral face, opposite to the first lateral face, on said second lateral side, and wherein the first portion and the second portion of the frame are linked to one another by a swivel joint about a folding axis enabling relative movability thereof between:
- an unfolded configuration wherein the steering column projects upwards with respect to the footboard for use during a displacement, said steering column extending in the midplane; and
- a folded configuration wherein the steering column is folded down along the footboard;

wherein the swivel joint is arranged for movability of the steering column from the unfolded configuration into the folded configuration wherein the steering column is folded down on the first lateral side with respect to the midplane and extends at distance from said midplane, at least partially beneath the footboard, along a first lateral flange of the footboard located on said first lateral side and facing the first lateral face of the rear wheel, wherein the swivel joint is in the form of a hinge provided with a first hinge knuckle secured to an upper segment of the first portion of the frame and with a second hinge knuckle secured to a lower segment of the second portion of the frame, where the first hinge knuckle and the second hinge knuckle are hinged relative to one another by a pivot defining the folding axis, so that said swivel joint is pivotally movable between:

a closed position corresponding to the unfolded configuration of the foldable scooter, wherein the upper segment of the first portion of the frame and the lower segment of the second portion of the frame are in alignment along a secondary axis contained in the midplane (PM); and an open position corresponding to the folded configuration of the foldable scooter, wherein the upper segment of the first portion of the frame and the lower segment of the second portion of the frame are misaligned and are disposed side-by-side following pivoting about the folding axis, wherein the first portion has two successive tubular sections:

a central section on which the footboard is fastened and which extends along the longitudinal axis; and an inclined section which projects from the central section and which extends along the secondary axis, wherein the first portion further comprises:

a front section fastened on a front end of the central section, at front and at distance from a junction between the inclined section and the central section, and a reinforcing section extending between the front section and the upper segment of the first portion, said reinforcing section extending between the secondary axis and the longitudinal axis to form a reinforcing structure with an inverted triangular geometry.

2. The foldable scooter according to claim 1, wherein the folding axis is offset on the first lateral side with respect to the midplane and the folding axis extends in an inclined manner with respect to the longitudinal axis with an angle of inclination comprised between 20 and 60 degrees.

3. The foldable scooter according to claim 1, wherein the folding axis extends parallel to the midplane.

4. The foldable scooter according to claim 1, wherein:

in the unfolded configuration, the steering axis is vertical or inclined with respect to the vertical by an angle comprised between 0 and 20 degrees; and in the folded configuration, the steering axis is horizontal or inclined with respect to the horizontal by an angle comprised between 0 and 20 degrees.

5. The foldable scooter according to claim 1, wherein, in the folded configuration, the steering axis is parallel, within 5 degrees, to the longitudinal axis.

6. The foldable scooter according to claim 1, wherein the secondary axis is inclined with respect to the longitudinal axis by a secondary angle comprised between 45 and 90 degrees.

7. The foldable scooter according to claim 1, wherein the folding axis is inclined with respect to the secondary axis by an intermediate angle which is comprised between 90 and 120 degrees.

8. The foldable scooter according to claim 1, wherein the swivel joint integrates a locking mechanism adapted to lock the swivel joint in the closed position.

9. The foldable scooter according to claim 8, wherein the locking mechanism comprises:

a movable locking element attached to one amongst the first hinge knuckle and the second hinge knuckle;

a complementary locking element attached to the other one amongst the first hinge knuckle and the second hinge knuckle, said movable locking element and said complementary locking element being adapted to cooperate together in a locking position to lock the swivel joint in the closed position, from an unlocking position wherein said movable locking element and said complementary locking element do not cooperate together so as to enable movability towards the open position; and a manual actuator shaped to act on said movable locking element to bring and block said movable locking element in the locking position.

10. The foldable scooter according to claim 9, wherein the locking mechanism comprises an elastic biasing member urging the movable locking element towards the unlocking position.

11. The foldable scooter according to claim 1, wherein the steering column has an upper end secured to a handlebar extending transversely and provided with two grips respectively to the right and to the left and, in the folded configuration, the rear wheel and the two grips have respectively three bearing points extending in the same plane enabling an upright bearing of the foldable scooter on these three bearing points resting on a horizontal plane.

12. The foldable scooter according to claim 11, wherein, in the folded configuration, the handlebar is inclined in a direction with respect to a base plane that is orthogonal to the transverse axis, and the front wheel is inclined in an opposite direction with respect to this same base plane.

13. The foldable scooter according to claim 1, wherein the rear wheel is carried by a rear transverse shaft extending along the transverse axis, and said rear transverse shaft is supported by a rear structure fastened to the frame and extending laterally on the second lateral side with respect to the midplane, and thus facing the second lateral face of the rear wheel, so that the rear transverse shaft protrudes from the rear structure to support the rear wheel in a cantilevered manner, and that the first lateral face of the rear wheel is cleared.

14. The foldable scooter according to claim 13, wherein the foldable scooter is motorized by comprising a motor equipped with a motor shaft driven in rotation about a motor axis and coupled to the rear wheel to drive the rear wheel in rotation via a transmission system, and wherein the transmission system comprises:

the rear transverse shaft having two opposite end portions, respectively a first end portion and a second end portion, the rear wheel being rotatably coupled on the second end portion of the rear transverse shaft;

a gear system comprising a gear ring meshing with a gear pinion, said gear ring being rotatably coupled on the first end portion of the rear transverse shaft, and said gear pinion being rotatably coupled to the motor shaft, so that a rotation of the motor shaft is convertible by said gear system into a rotation of the rear transverse shaft and of the rear wheel about the transverse axis; and the rear structure fastened to the frame and supporting at least the gear pinion and the first end portion of the rear transverse shaft, said rear structure extending laterally only on the second lateral side with respect to the midplane so that the second end portion of the rear transverse shaft protrudes from the rear structure to support the rear wheel in a cantilevered manner.

15. The foldable scooter according to claim 1, wherein the foldable scooter is motorized by comprising a motor equipped with a motor shaft driven in rotation about a motor axis and coupled to the rear wheel to drive the rear wheel in rotation via a transmission system.

16. A foldable scooter, comprising: a frame and a steering column equipped with a front wheel and pivotally mounted on said frame about a steering axis, the frame comprising a first portion supporting a rear wheel rotating about a transverse axis and a footboard and a second portion pivotally supporting the steering column, wherein the foldable scooter has a midplane orthogonal to the transverse axis and delimiting a first lateral side and a second lateral side opposite to one another, said midplane including a longitudinal axis passing through the front wheel and through the rear wheel and parallel to a direction of advance of the foldable scooter when the foldable scooter progresses in a straight line, and the rear wheel has a first lateral face on said first lateral side and a second lateral face, opposite to the first lateral face, on said second lateral side, and wherein the first portion and the second portion of the frame are linked to one another by a swivel joint about a folding axis enabling relative movability thereof between:
an unfolded configuration wherein the steering column projects upwards with respect to the footboard for use during a displacement, said steering column extending in the midplane; and
a folded configuration wherein the steering column is folded down along the footboard;
wherein the swivel joint is arranged for movability of the steering column from the unfolded configuration into the folded configuration wherein the steering column is folded down on the first lateral side with respect to the midplane and extends at distance from said midplane, at least partially beneath the footboard, along a first lateral flange of the footboard located on said first lateral side and facing the first lateral face of the rear wheel,
wherein the swivel joint is in the form of a hinge provided with a first hinge knuckle secured to an upper segment of the first portion of the frame and with a second hinge knuckle secured to a lower segment of the second portion of the frame, where the first hinge knuckle and the second hinge knuckle are hinged relative to one another by a pivot defining the folding axis, so that said swivel joint is pivotally movable between:
a closed position corresponding to the unfolded configuration of the foldable scooter, wherein the upper segment of the first portion of the frame and the lower segment of the second portion of the frame are in alignment along a secondary axis contained in the midplane (PM); and
an open position corresponding to the folded configuration of the foldable scooter, wherein the upper segment of the first portion of the frame and the lower segment of the second portion of the frame are misaligned and are disposed side-by-side following pivoting about the folding axis,
wherein the swivel joint integrates a locking mechanism adapted to lock the swivel joint in the closed position, wherein the locking mechanism comprises:
a movable locking element attached to one amongst the first hinge knuckle and the second hinge knuckle;
a complementary locking element attached to the other one amongst the first hinge knuckle and the second hinge knuckle, said movable locking element and said complementary locking element being adapted to cooperate together in a locking position to lock the swivel joint in the closed position, from an unlocking position wherein said movable locking element and said complementary locking element do not cooperate together so as to enable movability towards the open position; and
a manual actuator shaped to act on said movable locking element to bring and block said movable locking element in the locking position.

17. A foldable scooter, comprising: a frame and a steering column equipped with a front wheel and pivotally mounted on said frame about a steering axis, the frame comprising a first portion supporting a rear wheel rotating about a transverse axis and a footboard and a second portion pivotally supporting the steering column, wherein the foldable scooter has a midplane orthogonal to the transverse axis and delimiting a first lateral side and a second lateral side opposite to one another, said midplane including a longitudinal axis passing through the front wheel and through the rear wheel and parallel to a direction of advance of the foldable scooter when the foldable scooter progresses in a straight line, and the rear wheel has a first lateral face on said first lateral side and a second lateral face, opposite to the first lateral face, on said second lateral side,
and wherein the first portion and the second portion of the frame are linked to one another by a swivel joint about a folding axis enabling relative movability thereof between:
an unfolded configuration wherein the steering column projects upwards with respect to the footboard for use during a displacement, said steering column extending in the midplane; and
a folded configuration wherein the steering column is folded down along the footboard;
wherein the swivel joint is arranged for movability of the steering column from the unfolded configuration into the folded configuration wherein the steering column is folded down on the first lateral side with respect to the midplane and extends at distance from said midplane, at least partially beneath the footboard, along a first lateral flange of the footboard located on said first lateral side and facing the first lateral face of the rear wheel,
wherein the steering column has an upper end secured to a handlebar extending transversely and provided with two grips respectively to the right and to the left and, in the folded configuration, the rear wheel and the two grips have respectively three bearing points extending in the same plane enabling an upright bearing of the foldable scooter on these three bearing points resting on a horizontal plane,
wherein, in the folded configuration, the handlebar is inclined in a direction with respect to a base plane that is orthogonal to the transverse axis, and the front wheel is inclined in an opposite direction with respect to this same base plane.

* * * * *